US005926115A

United States Patent [19]

Schleder et al.

[11] Patent Number: 5,926,115

[45] Date of Patent: Jul. 20, 1999

[54] AIRFIELD SERIES CIRCUIT COMMUNICATIONS LIGHTING SYSTEM AND METHOD

[75] Inventors: William E. Schleder, Dublin; Shawn M. Hyde, Grandview Heights, both of Ohio

[73] Assignee: ADB Alnaco, Inc., Columbus, Ohio

[21] Appl. No.: 08/669,261

[22] Filed: Jun. 21, 1996

[51] Int. Cl.[6] .......... B64F 1/18

[52] U.S. Cl. .......... 340/953; 315/130; 340/642; 340/933

[58] Field of Search .......... 340/953, 933, 340/642, 947, 931; 315/130; 244/114 R

[56] References Cited

U.S. PATENT DOCUMENTS

| | | | |
|---|---|---|---|
| 3,715,741 | 2/1973 | McWade et al. | 340/642 |
| 3,771,120 | 11/1973 | Bonazoli et al. . | |
| 3,819,980 | 6/1974 | Mullersman | 315/86 |
| 3,943,339 | 3/1976 | Koerner et al. . | |
| 4,216,413 | 8/1980 | Plas | 315/323 |
| 4,242,614 | 12/1980 | Vatis et al. | 315/153 |
| 4,295,079 | 10/1981 | Otsuka et al. | 315/130 |
| 4,297,632 | 10/1981 | Glaser et al. | 324/51 |
| 4,330,778 | 5/1982 | Yamazaki et al. | 340/642 |
| 4,363,105 | 12/1982 | Plassmeier | 364/580 |
| 4,396,868 | 8/1983 | Watanabe | 315/130 |
| 4,418,333 | 11/1983 | Schwarzbach et al. | 340/310 |
| 4,449,073 | 5/1984 | Mongoven et al. | 315/130 |
| 4,466,071 | 8/1984 | Russell, Jr. | 364/492 |
| 4,481,516 | 11/1984 | Michelotti | 340/933 |
| 4,590,471 | 5/1986 | Pieroway et al. | 340/825.69 |

(List continued on next page.)

FOREIGN PATENT DOCUMENTS

| | | | |
|---|---|---|---|
| 284 592 | 3/1988 | European Pat. Off. | 39/10 |
| PCT SE89/ 00546 | 4/1990 | European Pat. Off. . | |
| PCT SE90/ 00582 | 4/1991 | European Pat. Off. | 37/2 |
| 470324 | 1/1929 | Germany | 21/42 |
| 15806451 | 5/1978 | Germany | 37/3 |
| 64 88900 | 4/1989 | Japan | 5/6 |

(List continued on next page.)

OTHER PUBLICATIONS

*Airport Technology*, "Stop Bar —Utilizing Smart Power Technique Concept".

*Airport Technology*, "Taxiway Guidance —Utilizing Smart Power Technique Concept".

"Automatic Monitoring System for the CCR and Aerodrome Lighting System on Airport System"; Nobuyuki Matsunage, Yorio Hosokawa and Osafumi Takemoto, IEEE, 1980.

"A New System for Selective Control of Taxiway Lights"; Aviation Lighting Conference, Oct. 11, 1988, Goran Eriksson.

"The Swedish Approach to Airfield Lighting Control"; Aviation Lighting Conference, Oct. 11, 1988, N. Goran Eriksson.

"The Swedish Approach to an SMGC System"; Goran Eriksson, Jul. 29, 1989.

*Primary Examiner*—Brent A. Swarthout

[57] ABSTRACT

A microprocessor-controlled airfield series lighting circuit communications system and method allows bi-directional communication between the controlling microprocessor and the airfield lamps. The bi-directional communications signals are formed by using a modulated radio-frequency signal that is transmitted through a circuit containing many transformers having their primary windings connected in series. Respective secondary windings of the transformers are connected to various devices, such as lamps or sensors. A high frequency signal is imposed on the series-connected primary windings to control the lamps. The frequency of this signal is selected to be able to be detected on the secondary side of the transformer. A remote controller is connected to the secondary of each transformer to receive the control signal and selectively switch power obtained from the transformer secondary to the respective connected device. Any one of the multiple controllers can be configured as a repeater for any other one of the controller. As a repeater, the controller receives a control message addressed to a target controller and retransmits the message to the target controller.

17 Claims, 19 Drawing Sheets

U.S. PATENT DOCUMENTS

| | | | |
|---|---|---|---|
| 4,646,088 | 2/1987 | Inoue | 340/870.31 |
| 4,675,574 | 6/1987 | Delflache | 315/130 |
| 4,754,201 | 6/1988 | Knoble et al. | 315/130 |
| 4,901,257 | 2/1990 | Chang et al. | 364/571.01 |
| 4,939,505 | 7/1990 | Cappellini et al. | 340/642 |
| 4,951,046 | 8/1990 | Lambert et al. | 340/953 |
| 5,034,659 | 7/1991 | Taniguchi | 340/642 |
| 5,220,321 | 6/1993 | Sauer | 340/931 |
| 5,239,236 | 8/1993 | Backstrom et al. | 315/185 |
| 5,243,340 | 9/1993 | Norman et al. | 340/953 |
| 5,359,325 | 10/1994 | Ford et al. | 340/642 |
| 5,485,151 | 1/1996 | Runyon et al. | 340/953 |
| 5,581,229 | 12/1996 | Hunt | 340/642 |

FOREIGN PATENT DOCUMENTS

| | | | |
|---|---|---|---|
| 367430 | 2/1932 | United Kingdom . | |
| 568622 | 4/1945 | United Kingdom . | |
| 1057401 | 2/1967 | United Kingdom | 37/2 |
| 1424802 | 2/1976 | United Kingdom | 37/2 |
| 2174852 | 12/1986 | United Kingdom | 37/2 |

AIRFIELD SERIES CIRCUIT COMMUNICATIONS LIGHTING SYSTEM AND METHOD

FIELD OF THE INVENTION

This invention relates to a system and method for forming and sending bi-directional communication signals for airfield lighting control using a modulated radio-frequency signal that is transmitted through a circuit containing many transformers connected in series.

BACKGROUND OF THE INVENTION

The control of aircraft on the ground is a complex task. Airfields generally provide control and guidance to aircraft while taxiing or standing both before takeoff and after landing.

Airfield lighting control systems have been developed to avoid incursions onto an active runway or taxiway, thereby reducing the likelihood of collisions between aircraft, especially during conditions of low visibility.

At airports it is important to provide communication between a computer in the tower and individual lighting control elements on the airfield. This is desirable to monitor and control a variety of conditions, for example, to determine the location of lamps which have failed, the status of stop bar lights, and to implement surface movement guidance and control systems.

At least one system has been provided for switching and monitoring individual lights on the airfield. This airfield lighting system is disclosed in the patent to Runyon et al. (U.S. Pat. No. 5,485,151). This system, however, attaches directly to the high voltage primary on the series circuit, which may tend to increase its size and cost.

The lamps in an airfield lighting system are typically powered by current isolation transformers having primary windings that are connected in series and secondary windings that are coupled to provide power to the lamps. Because the transformers are connected in series, the failure of a single lamp will not affect the operation of the remaining lamps in the circuit.

The circuit is powered by a device called a constant current regulator (CCR). A CCR may provide a regulated current in either three or five discrete steps. The maximum output current may be as low as 6.6 A or as high as 20 A. The current is changed to control the brightness of the lamps to compensate for different weather or visibility conditions.

Airfield lighting systems need to be carefully monitored to ensure that failed lamps are promptly discovered and that remedial action is taken as soon as possible. One type of lamp-out monitoring system operates by monitoring a parameter which is only available at the output of the CCR, such as voltage, current, or waveshape deviation. A disadvantage of this type of system is that the location of the failed lamp may be difficult to determine.

Another type of monitoring system uses an electronic circuit coupled to the secondary winding of the current isolation transformer. When a lamp fails, the circuit periodically shorts and opens the secondary during a predefined time period. The failed lamp location is identified by a master unit in a vault computer which detects a change in impedance during the predefined time period. A disadvantage of this system is that communication is uni-directional. Commands may not be sent to devices connected to the secondary of the isolation transformers.

Another type of system also uses an electronic circuit on the current transformer secondary and communication is accomplished by varying the impedance on the secondary. The impedance variation is controlled according to a predefined communication protocol. The master unit in the vault computer detects the information according to the protocol. The master can also send out messages, using its own protocol, to the circuits on the series circuit. In this manner, monitoring and control information can be sent back and forth on the series circuit. A disadvantage of this system is that a relatively low frequency signal may be needed to provide sufficient signal amplitude through the current transformer for the signal to be detected by the vault computer. Another disadvantage relates to the use of impedance changes to provide communication. If there is a long wire connecting the transformer secondary to the load, the impedance of this secondary wire may reduce the amplitude of the transmitted impedance changes. A system of this type may also be susceptible to radio-frequency interference (RFI) and to overall impedance changes in the series circuit, such as when the circuit is physically reconfigured or when lamps are added to the circuit.

Another type of system electrically connects to both the primary and secondary of the current transformer. Bi-directional communication with the master is achieved by directly transmitting a single base high frequency on the series circuit. This configuration allows a relatively high communication rate with a relatively large amount of data within the protocol. A disadvantage of this type of system is that the connection to the primary may be subject to high voltages and may result in higher cost compared to systems that connect only to the secondary.

SUMMARY OF THE INVENTION

The present invention provides a relatively high-rate bi-directional communication system and method which operates through the isolation transformer windings of a series connected electrical system. More specifically, this invention provides a system and method to generate, transmit and receive communication signals. The system operates by imposing a high frequency signal on the secondary side of the isolation transformer so that it may pass through to the primary side of the transformer and propagate along a cable to other remotes or to the vault building of an airport lighting system.

The present invention provides a remote-unit control circuit connected to only the secondary winding of the current isolation transformer. The airfield series circuit consists of a plurality of series-connected current isolation transformers, respective secondary windings of the transformers are connected to various load devices, such as lamps, but may also include devices such as microwave presence sensors. A CCR provides regulated constant current to the series circuit.

The foregoing and other aspects of the present invention will become apparent from the following detailed description of the invention when considered in conjunction with the accompanying drawings.

DETAILED DESCRIPTION OF THE EXEMPLARY EMBODIMENTS

The present invention relates to a data communications system and method which operates by imposing high frequency communications signals on the secondary side of an isolation transformer so that they may pass through to the primary side of the transformer and propagate along a cable to other remotes or to a vault computer. Thus the invention is embodied in a bi-directional communication system and method which allows a relatively high communication rate and has a connection, at the remote sites, only to the secondary winding of the isolation transformer.

Figure 1A:
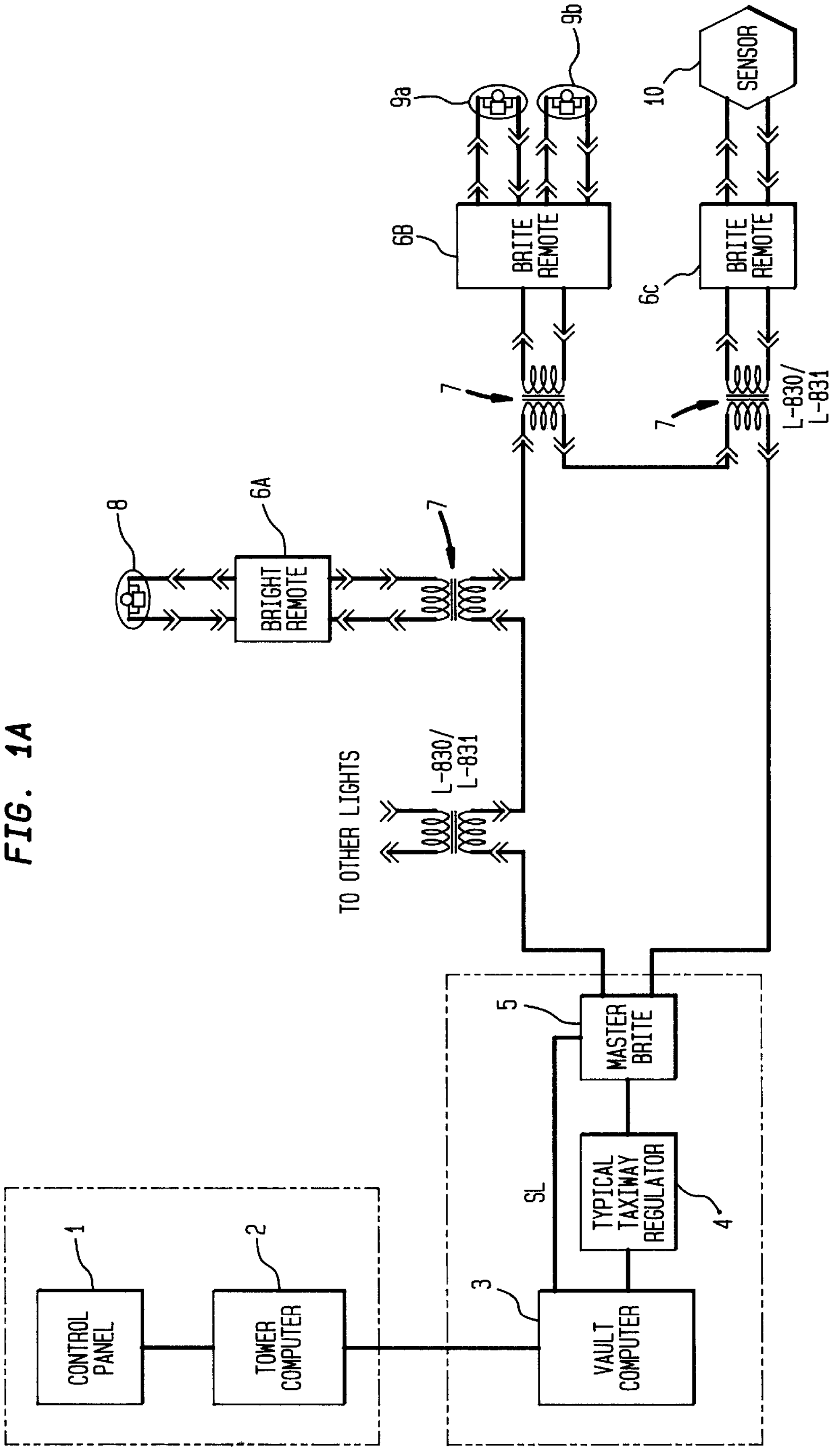
FIG. 1*a* is a schematic diagram, partly in block diagram form, of an airfield lighting system including an exemplary communication system in accordance with the present invention.

FIG. 1*a*, is a schematic circuit diagram of an airfield lighting system including an exemplary communication system in accordance with the present invention.

An airport may have an air traffic control tower and a control panel 1 to control lights on the airfield. Equipment rooms are provided directly beneath the floor of the room in which the air traffic controllers are stationed. A tower computer 2, located in one of the equipment rooms, drives the control panel 1.

The power sources for the lights on the airfield are constant current regulators (CCRs) 4. There may be up to 120 CCRs at an airport, depending upon the size of the airport. Each CCR 4 is a power source that may, for example, have three to five output current steps.

Vault buildings house the CCRs 4 and are typically located out on the airfield. An airport may have as few as one or as many as four or more vault buildings. For communication between the tower and the vault building, another computer, called a vault computer 3, is located in the vault building. Lamp intensity commands are sent to the CCRs 4 from the control panel, via the tower computer, to power the lights on the airfield. To communicate with the master control module 5, there is a serial link (SL) from the vault computer 3 to the master control module 5. This serial link is used for communication between the computer 3 and the module 5. The master control module 5 contains a microprocessor. It is described below with reference to FIGS. 6*a* through 6*d*.

The output signal of a CCR 4 is a regulated current in a series circuit. A loop of wire connects to each transformer primary and provides a return path to the CCR 4. Thus, the interconnected transformers form a loop or series circuit. Because the series circuit is powered by a CCR 4, the current is essentially the same all the way around the loop regardless of the position on the loop. An isolation transformer is used so that if one light fails, the other lights will not go out. Since there may be different wattage lamps connected to respective isolation transformers there may be different wattage isolation transformers. These may vary, for example, from 30 watts to 500 watts.

At a high level, the system operates as follows. A control panel 1, such as a push-button or a touchscreen, is used by an air traffic controller in a control tower to issue commands or obtain monitoring and alarm information. The control panel 1 communicates with a tower computer 2. The tower computer 2 translates operator inputs into airfield lighting commands. The tower computer 2 continuously scans the control panel settings and decides which lights should be controlled and to what circuit the lights belong. The tower computer 2 then transmits the commands to the appropriate vault computer 3.

The vault computer 3 may transmit the commands received from the tower computer 2 to the CCR 4 to control light intensity for all of the lights on the airfield and to the master control module 5 and other airfield lighting devices to specifically control these devices as commanded by the tower computer 2. The vault computer 3 also provides monitoring and alarm signals to the control tower which have been received from the remote controllers 6*a*–6*c* via the master control module 5. If there is a communications failure, the vault computer 3 reverts to a pre-defined fail-safe setting. This causes the CCR 4 to provide the proper current for the fail-safe intensity of the airport lights. Also, upon detecting a communications failure, each remote reverts to a pre-defined fail-safe setting. The fail-safe setting for each remote may be either on or off.

The master control module 5 couples communication signals between the vault computer 3 and the remotes 6*a*–6*c* on the series circuit. The master control module 5 serves as the interface between the low voltage digital communications signals and the high voltage output signal of the CCR 4. The master control module 5 injects a radio-frequency radio signal at 125 KHz on the current signal provided to the series circuit. It has been determined that signals at this frequency propagate well through the standard isolation transformers used on series circuits. The radio frequency signal is modulated using frequency shift keying (FSK). While 125 KHz is used in the exemplary embodiment, it is contemplated that other frequencies may also be used that propagate with relatively low levels of attenuation through the isolation transformers used in the circuit.

When the master control module 5 sends out a signal, each remote controller 6 (i.e., remote 6*a*, 6*b* or 6*c* in FIG. 1*a*), having a unique digital address, receives the signal. The remote controllers decode the information and if the remote receives a message that is addressed to it, the remote takes appropriate action with respect to the lamp, sensor or other remotely controlled device or sends a message to the master control module 5 with a status value, such as a measure of the current through the lamp or of the voltage across the lamp. The remote 6 also injects a radio-frequency signal on the current loop when it responds.

Figure 1B:
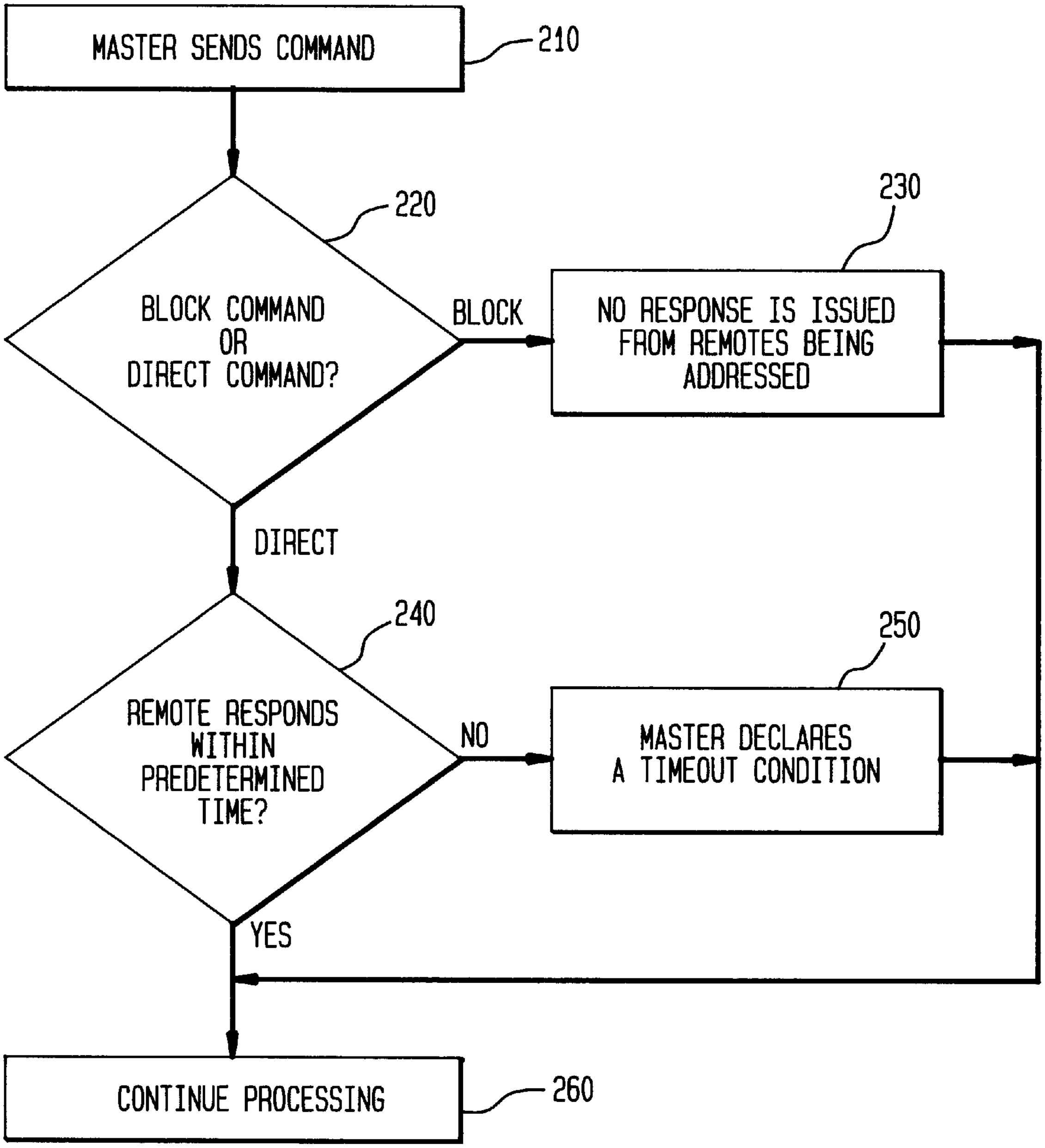
FIG. 1*b* is a flowchart of the command communication and timing operation in accordance with an exemplary embodiment of the present invention.

FIG. 1*b* is a flowchart diagram which illustrates an exemplary command communication protocol and its timing. Communication is initiated by the master control module 5 with the issuance of a command, step 210. The commands used in the exemplary embodiment of the invention are variable length having as few as four bytes. Each command includes a cyclic redundancy code (CRC) which is used to ensure that the command has been received without error. Commands are sent using a serial, asynchronous byte format. The type of command, a block command or a direct command, is determined at step 220. A block command is processed differently than a direct command with respect to a particular remote controller 6. A block command is addressed to a group of remotes simultaneously. With a block command, the remote controllers being addressed act pursuant to the command, but do not issue an acknowledgment response back to the master control module 5, step 230, and processing continues, step 260. Each remote controller 6 may be assigned to multiple blocks.

A direct command is addressed to only one remote controller 6 and directs that remote to act pursuant to the command and to respond with an acknowledgment to the master control module 5 within a predetermined time, step 240. If the remote controller 6 being addressed does not respond to the master control module 5 within the predetermined time, the master control module 5 declares a time-out condition and assumes that no response was issued and that transmission has ended, step 250. Normal processing then continues, step 260. In this processing, the master control module 5 may retry the failed command transmission. In addition, it is contemplated that the master control module 5 may attempt to establish another remote controller 6 as a repeater for the remote that timed out and to route the message which was not received by the one remote controller through the repeater.

The exemplary embodiment of the invention supports the following types of commands: 1) Remote Controller reset—causes a remote processor to attempt to restart its processor; 2) Read Software Version Update—causes the remote controller to send its software version to the master controller; 3) Download Remote Configuration—causes a remote controller to load new configuration information; this information includes a communications time-out value, fail-safe delays, fail-safe commands and block IDs for blocks to which the remote controller belongs; 4) Download Remote Address Configuration—causes a remote to load new address configuration; this information includes the address of the remote controller, its repeater ID, the remote controllers for which it acts as a repeater and the repeater Ids (next and previous) to which the remote sends its messages in a multi-repeater configuration); 5) Read Configuration Data—causes the remote controller to send its configuration data to the master controller; 6) Read Remote Status—causes the remote processor to send several values including: analog current, analog voltage, input port byte and output port byte to the master controller; 7) Write to Output Port—causes the remote controller to write a transmitted data value to its output port, this is the way in which the remote processor sends a command to a digital control; 8) Read Output Port—causes the remote controller to send the value that it has written to its output port back to the master controller, this enables the master controller to confirm that a requested data value was sent by the remote controller to a controlled device; 9) Read Input Port—causes the remote controller to send the value currently applied to its input port to the master controller, this is the way in which the remote controller sends requested data values to the master controller; 10) Read Voltage or Current—causes the remote controller to send its current voltage or current value to the master controller; 11) Circuits On/Off—causes the remote controller to switch its either or both of its two load circuits on or off, the desired status is indicated by individual bits in the command byte; 12) Enhanced Circuit Control Mode—causes the addressed remote controller to perform specified functions on the controlled lights, including single flash, blink, single flash off and delayed turn on or turn off; and 13) Read Remote Operating Status—causes the remote controller to return a value representing elapsed time since its last reset. Using these commands, the master controller 5 controls all communication with the remote controllers 6. This protocol essentially eliminates the possibility of bus contention on the current loop.

It is noted that the exemplary remote controllers 6*a*–6*c* each has a port which may be used to connect a dedicated communication cable to provide an alternate method of communicating with the master control module 5.

High transmission rates (approximately 9600 baud) between the master control module 5 and remotes 6*a*–6*c* provide the required performance on timing-critical applications, such as stop bars, while at the same time, error checking and anti-babbling circuitry ensure reliable signal propagation. An anti-babbling timer (not shown) prevents the entire network from being disabled if a single remote is stuck on in a continuous transmit mode. The high communication rate is achieved through the use of a streamlined protocol which is dedicated to airfield applications. In the exemplary embodiment of the invention, the vault computer 3 may communicate with up to 32 masters, and each master may communicate with up to approximately 60,000 remotes. There can also be approximately 32,000 repeaters.

Both the master control module 5 and all remotes 6*a*–6*c* operate in an environment which is susceptible to lightning. Because of this, there is surge protection on the external wiring of the master control module 5 and the remotes 6*a*–6*c*.

Either the vault computer 3 or the tower computer 2 can be connected to a maintenance center (not shown) where system information can be displayed, analyzed and stored.

Each remote controller 6 is a microprocessor-based unit having a configurable address. Each remote on a series circuit is set to a different address and connects to the secondary, low voltage side of a power isolation transformer 7 (e.g., FAA L-830 or L-831) from which the remote obtains operating power. Each remote controller 6 is physically compact and is manufactured to comply with NEMA 6P or IP 68. The remote can also withstand the environment in an airport base can or in an above-ground light fixture where it may be installed. In other words, each remote is submersible and able to operate well at extreme operating temperatures.

Each remote controller 6 is provided with a feature that shorts the secondary of the isolation transformer 7 when a lamp burn out is detected. This prevents an overload on the CCR 4 and also ensures that the nominal series circuit voltage does not rise. Each remote controller 6 also "soft-starts" its lamp, eliminating in-rush current, to increase lamp-life. This is accomplished by gradually pulsing the light on over a period of approximately one second after the lamp is initially turned on.

The remote controller 6 may be connected in one of several ways. In FIG. 1*a*, the remote 6*a* is connected to a single lamp 8, having a power rating up to 500 W. It should be noted that a group of lamps may also be connected in series and then connected to the remote 6*a*. The remote 6*b* is connected to two lamps 9*a* and 9*b*. In the exemplary embodiment of the invention, the maximum combined instantaneous load does not exceed 500 W. One use for a multi-lamp controller is in a single stop bar fixture that uses one red and one yellow lamp. In this configuration, the remote 6*c* is connected to an aircraft presence sensor 10 via a dedicated I/O port to sense the presence of an aircraft and control the stop-bar accordingly.

Each exemplary remote controller 6 also performs automatic self-test and diagnostics. The remote is configurable via software which is stored in a non-volatile memory (not shown).

As described above, in operation, the master control module 5 transmits a radio-frequency FSK signal on the series circuit, which all remote controllers 6 receive. Depending upon the application, a particular remote takes action, such as switching a light, or responds with a feedback signal. In some installations, the signal strength may be insufficient to go around the entire series circuit. To compensate for the attenuation of the signal and noise contamination, a repeater is used in the present invention. A repeater may be used to compensate for signal attenuation or to improve the signal to noise ratio for a signal being transmitted to a particular remote controller 6. When a broadcast command is sent, it may be sent on a series circuit that is noisy or has poor dielectric strength. In addition, capacitance between adjacent wires may cause a cross-coupling of the signals conveyed by the wires. Finally, there may be a coupling of noise and other signals from other master control modules or a reflection of the transmitted signal which creates a standing-wave effect at a particular remote controller. These conditions may result in attenuation loss and signal contamination causing poor communication.

A repeater may be used to implement communications with remote controllers 6 which can not receive an acceptable communications signal from the master controller 5. In the exemplary embodiment of the invention, any remote controller may be configured as a repeater for any other remote controller using the Download Remote Configuration command, described above. Each repeater receives and retransmits the signal without contaminating noise or with reduced noise. Typically, repeaters are selectively placed only at locations on the series circuit where the signal transmitted from the master controller 5 has a relatively high signal to noise ratio.

Any remote may be configured to act as a repeater in addition to performing its control functions. The vault computer 3 sends out a Download Remote Configuration command to direct a particular remote to act as a repeater. For example, the vault computer 3 may send out a command that "remote #5 is now a repeater for remotes #6–#10". If it is desired to turn a light on remote #9 on, remote #5 (the repeater) receives a Circuit On command from the master, the address of which includes the remote identifier assigned to remote #5 and the address of remote #9. The remote #5 receives the message and retransmits it to remote #9 with just the address of remote #9 in the address field. When remote #9 responds, remote #5 receives the response and sends it to the master controller. Although repeaters may reduce the communication speed, any such reduction is not believed to affect system operations since millisecond-type communications are not needed. When one or more repeaters are used in a command chain, however, the master controller adjusts its time-out value to allow for the delay incurred by using the repeaters.

There may be multiple repeaters in an airfield lighting system. If multiple repeaters are used, the message may be passed from one repeater to the next repeater, until the message gets to the repeater to which the ultimate remote controller is assigned. This repeater then sends the message to the assigned remote controller. The response may then be passed from one repeater to the next repeater, until it reaches the master control module 5. Each repeater is configured to know which repeaters are on either side of it, as well as the remotes which with it can communicate via the Download Remote Address Configuration command.

Figure 1C:
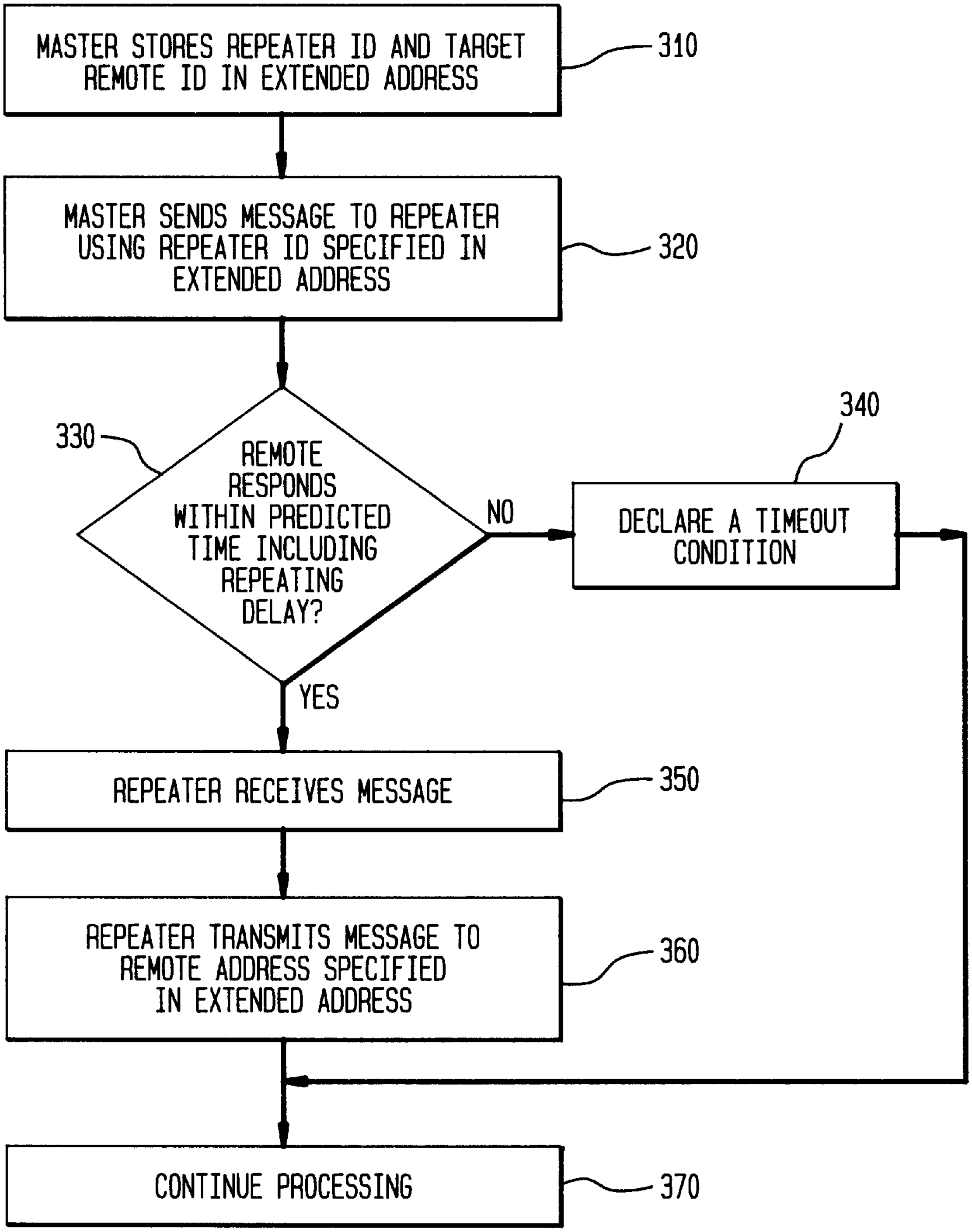
FIG. 1*c* is a flowchart of the repeater operation in accordance with an exemplary embodiment of the present invention.

FIG. 1*c* is a flowchart diagram of the repeater operation in accordance with the present invention. To send a message to a remote 6 through a repeater, the master control module 5 first sets the repeater ID and the address of the remote to which the command is to be sent in the extended address field (not shown) of the command, step 310. The master control module 5 then sends the message to the repeater using the repeater ID specified in the extended address, step 320. If the repeater can communicate with the specified remote device, as determined at step 330, the repeater receives the message, step 350, removes the repeater ID from the address portion and transmits the message to the address of the remote which is also specified in the extended address, step 360. Normal processing continues at step 370. It should be noted that when communicating through repeaters, the master control module 5 takes into account the extra transmission times and adjusts the predetermined time before issuing a time-out condition, as in step 250.

At step 330, if the repeater is determined to be unable to communicate with the remote because the master controller 5 timed-out (step 340) on the reply from the remote, the master may automatically reconfigure a remote controller which is close in position to the target remote or otherwise in good communication with the target remote to be a repeater for the target remote. This may be done, as described above, using the Download Remote Address Configuration command. In a multi-repeater system, the repeater which previously was responsible for sending messages to the target remote may also need to be reconfigured to send messages through the newly configured repeater. Once the repeaters have been configured the original message is resent with the repeater ID of the newly configured repeater in the extended address. If the newly configured repeater is operable (i.e. if the master controller 5 receives a response), step 330, then processing continues as set forth above. If this repeater is not operable, then the next closest remote controller to the target remote may be configured as a repeater and the process may be repeated. Thus, if a neighboring repeater is operable, the message is transmitted through it, rather than the originally intended, yet inoperable, remote.

Although the flowchart diagram of FIG. 1*c* addresses the situation where the initial command is sent through a repeater, it is also applicable when the initial command is sent directly to the target remote controller.

As described above with respect to FIG. 1*b*, there is also a group addressing capability in the present system. This capability allows the control system to implement a primitive multicasting protocol. The master control module 5 may address more than one remote controller 6 with a single message. The protocol is flexible and actions can be taken such as switching a block of lights by sending a single command addressed to a group of lights. There are a maximum of 65,536 groups in the protocol defined in the exemplary system and each remote output channel may be assigned to as many as 20 groups.

There is also error detection embedded in the protocol which includes a cyclic redundancy code (CRC) appended to each message. All commands are terminated with a CRC. Addressed remotes that detect a CRC error in the message respond as if no message were received at all; i.e., no action is taken and no response is issued. When a master control module 5 detects a CRC error, it is treated as if no response message were received at all.

The present system includes microwave detection sensors 10. To reset lights on a stop bar, a microwave detection sensor 10 is provided. The sensor 10 is a beam breaker device having a transmitter on one side and a receiver on the other side. A stop bar is a row of lights across the taxiway that are normally red or yellow in low visibility conditions. Airplanes stop at the red lights and, when the air traffic controller pushes a button, the red lights go off and then the green center run lights beyond the stop bar switch on to direct the airplane out into the runway. The microwave detection sensor 10 is located across the taxiway and when the nose of the airplane crosses the beam, the beam is broken and the system causes the stop bar lights to turn back on. This detected broken beam also resets the green center run lights, as the airplane moves forward. It is contemplated that the exemplary system may use sensors other than microwave sensors. Any suitably appropriate device for sensing an object such as an airplane or a maintenance vehicle may be used. It is noted that in good visibility conditions the red lights can be switched to yellow and all green lights are switched on.

When the sensors 10 sense an object, the vault computer 3 is alerted and the vault computer 3 controls the actual switching of the lights. When an object is present, it is detected by the remote controller 6*c*, which sends a message to the vault computer 3. The vault computer 3 then broadcasts commands to a block of lights from the master control module 5. For example, commanding the red stop bar lights (not shown) to switch on and the first segments of green center run lights (not shown) to switch off. This switching may be controlled by the vault computer 3 or by the tower computer 2. If the switching is controlled by the vault computer 3, after switching the lights it sends the message to the tower indicating that an object has been sensed by the sensor 10.

Conflict occurs if more than one remote responds at the same time. In the present system, there should be no conflict on the network, for example, with respect to a situation in which a switch closure from a sensor is sent out by one of the remotes at the same time another remote is forwarding a response back to the vault computer. This is because no remote can transmit a message on its own; it must be polled by the master controller 5. For example, the master controller 5 may command certain remote controllers 6 to switch their lights, and then poll the remotes to receive an acknowledge response.

Conflict due to signal crosstalk is believed to be substantially eliminated or its effects at least reduced by using different addresses for every remote on the airfield. Crosstalk may otherwise occur as follows: assuming a limited number of addresses for remotes, some remotes may have the same address. For example, assume two circuits with a master at each circuit and 50 remotes on each circuit, each with the same address 1–50. It is possible for the master in the first circuit to direct light 49 to switch on, and, due to crosstalk with the second circuit, there is enough signal coupling such that remote 49 of circuit 2 would also switch on. The protocol defined for the exemplary system allows for 60,000 remotes, 32,000 repeaters and 32 masters per vault computer so that every remote at an airport may be given a different address.

Furthermore, if cross-coupling is detected in the exemplary system, the vault computer can send out a signal directing all the other masters to be silent. However, if there is a different address for each remote, block commands can be transmitted without difficulty. In this manner, multiple masters can communicate at the same time if each remote has a different address.

There are two different mechanisms used for communication. One is for fast communications for block commands. It is an unacknowledged command and to make sure the remote gets the command, the command is sent out several times (usually three times) in a short interval as a block command. The remote should receive the command on the first transmission. At times, one of the remotes may receive the command on the second transmission. If a remote receives a redundant command, there is no harm. If, however, one of the commands is not received, no time is wasted waiting for an acknowledgment that does not arrive and then resending the command.

With other types of commands, such as those in which monitoring is involved, it is desirable to receive an acknowledgment from the remote. In the protocol used in the exemplary system, the remote sends an acknowledgment when it receives each message. This protocol may take more time, than assuming that the command has been received but it adds a needed level of confidence to the system. In the exemplary system, if no acknowledgment is received from the remote, the command is sent three more times. If no response is received after the fourth transmission, the remote is declared dead.

A single light may not be controlled by multiple remotes. However, multiple lights may be controlled by a single remote.

There is a failsafe timer inside the microprocessor of each of the remote controllers 6. After a preset time period, usually one minute, with no communication from the master controller 5, the failsafe timer is activated and the program which controls the remote causes the lamp to exhibit a certain preset behavior, such as off or flash. The preset time period and the fail-safe mode can be programmed into each remote from the vault computer 3.

Figure 2A:
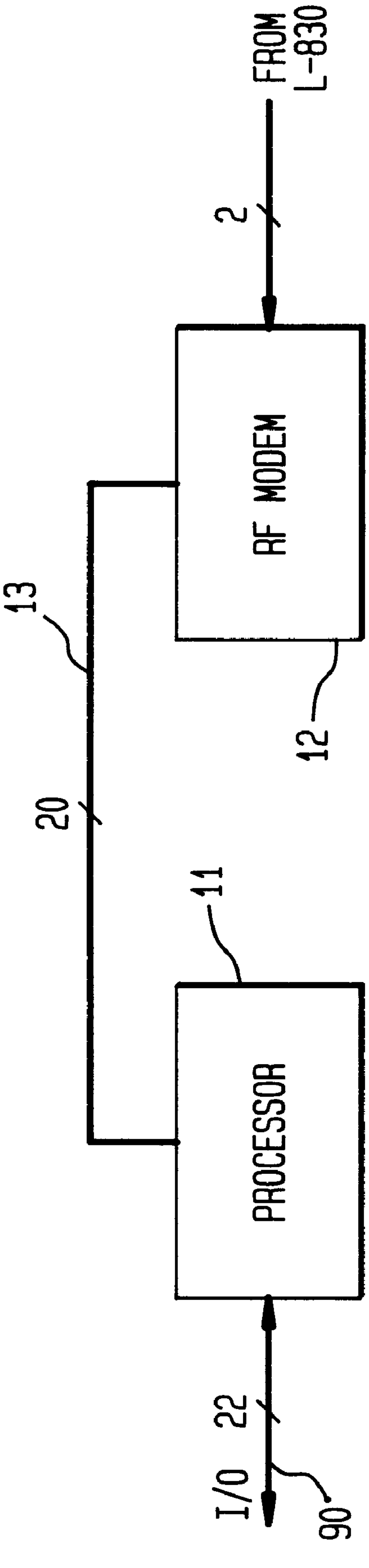
FIG. 2*a* is a block diagram of a master control module in accordance with an exemplary embodiment of the present invention.

FIG. 2*a* shows a block diagram of a master control module in accordance with an exemplary embodiment of the system. There are two main blocks, the processor 11 and the RF modem 12. The exemplary processor 11 and RF modem 12 are implemented together on a single circuit board, known as the master processor board. The processor 11 is connected to the vault computer 3 via a serial communications link. A 22-pin connector provides I/O capability to the master enabling it to monitor, for example, a current sensing relay (not shown in FIG. 2*a*) to verify CCR current flow. The processor interfaces to the RF modem using a serial communications link. The RF modem 12 has the secondary of a high-frequency isolation transformer as its input. The communication signal is coupled through this isolation transformer onto the high voltage primary circuit. A connection, such as an RS-422 connection, provides a serial communications path to the vault computer 3 (in FIG. 1*a*). Power for operation of the master control module 5 is obtained from an external 50 or 60 Hz power source.

Figure 2B:
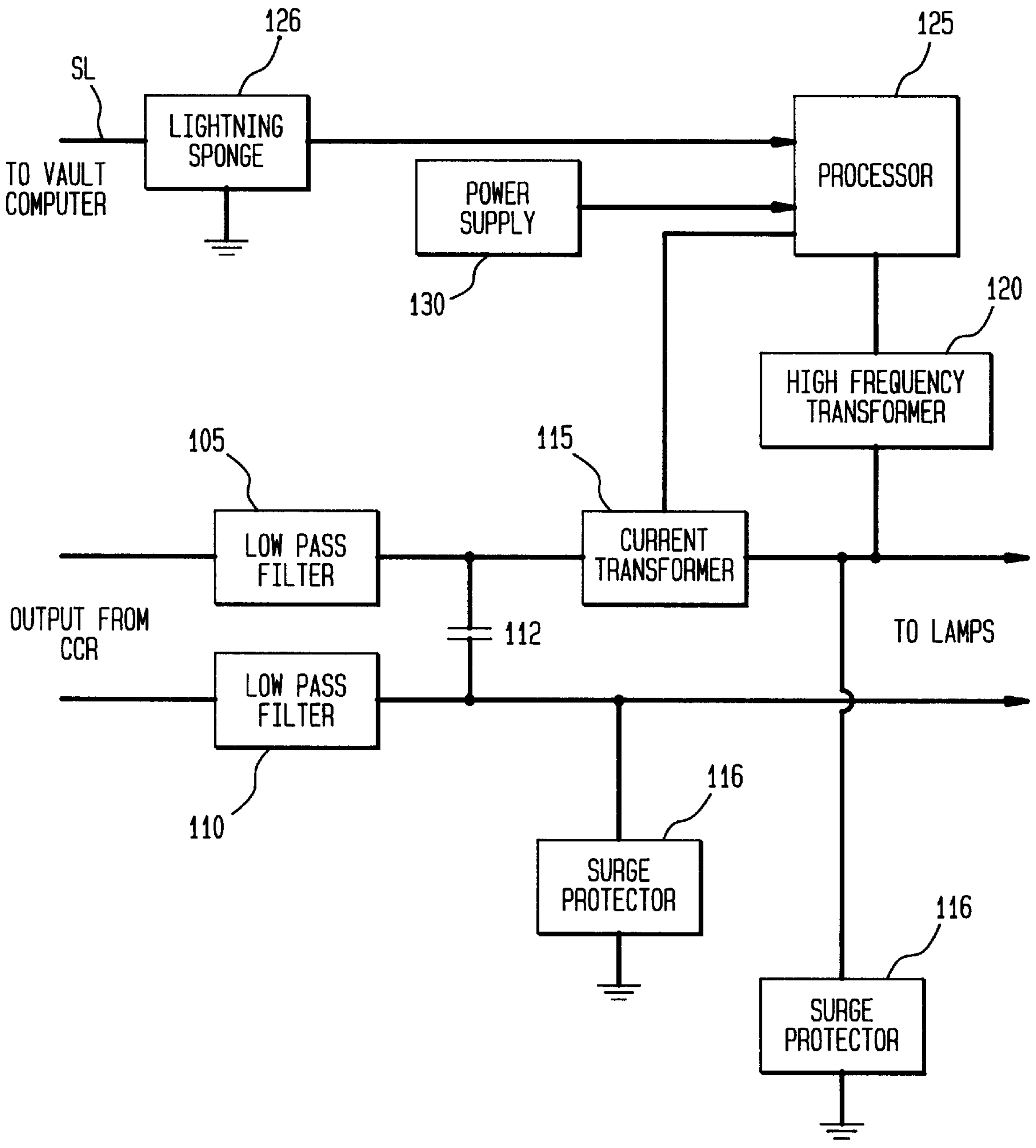
FIG. 2*b* is a block diagram, partly in schematic diagram form, of a master control module in accordance with a further exemplary embodiment of the present invention.

In FIG. 2*b*, a power supply 130 provides the DC power to drive the processor board 125 of the master control module. The processor board 125 is also coupled to transfer data and commands to and from the vault computer 3 via the serial link, SL. This link is protected against lightning surges by the lightning sponge 126. The master processor board 125 is coupled to the series circuit supplied by the constant current regulator (CCR) 4 to communicate with the various remote processors 6. The current supplied by the CCR 4 to the series circuit is filtered through low-pass filters 105 and 110. The low pass filters 105 and 110 and the capacitor 112 act as an electromagnetic interference filter to minimize or at least reduce interference from the regulator which may affect the communication signals transferred between the master processor board 125 and the remote processors 6. The communications signals are coupled to the series circuit via a high frequency transformer 120, which is controlled by a processor board 125. This transformer is used to induce communication signals on the line as well as to receive communications signals provided by the various remote processors 6. To protect the processor board 125 and transformer 120, the constant current supply lines are coupled to respective surge protectors 116. The master control module also includes a current sensing relay or transformer 115 which allows it to directly monitor the current signal provided by the CCR 4.

Figure 3A:
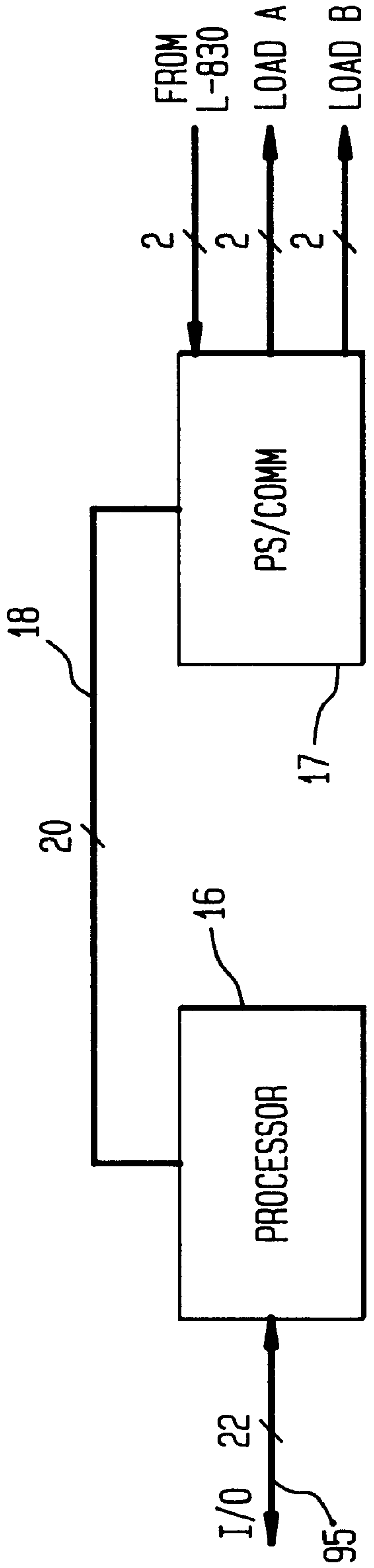
FIG. 3*a* is a block diagram of a remote controller in accordance with an exemplary embodiment of the present invention.

Referring to FIG. 3*a*, there is shown a block diagram of a remote controller in accordance with an exemplary embodiment of the present invention. FIG. 3*a* defines the number of wires going in and out between the processor board 16 and the power supply/communication board 17. The two main blocks 16 and 17 are connected together with a 20 pin ribbon cable 18. The processor 16 optionally connects to an I/O port 95 via a 22 pin connector. The I/O port 95 provides for +5 V, ground, four digital inputs, four digital outputs, four analog inputs and external communication links. The power supply/communication block 17 has the secondary of an isolation transformer as its input. The communication signal is coupled through this isolation transformer. The load on the isolation transformer is switched at either output load A, output load B or both.

Figure 3B:
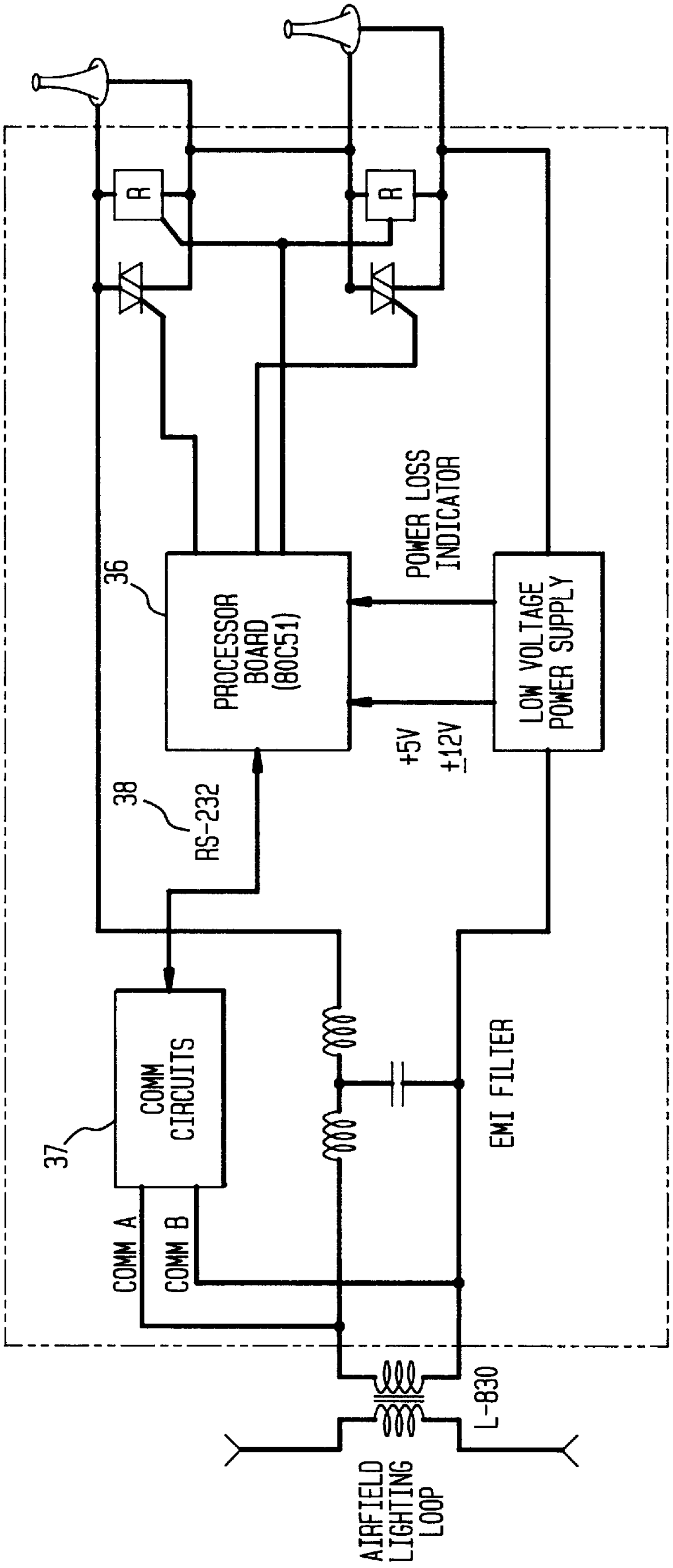
FIG. 3*b* is a schematic diagram, partly in block diagram form, of a remote controller in accordance with a further exemplary embodiment of the present invention.

Referring to FIG. 3*b*, there is shown a schematic circuit diagram of a remote controller in accordance with a further exemplary embodiment of the system. There are two main blocks, a processor board 36 and a power supply/communication board 37. The two blocks 36 and 37 are connected together with an asynchronous serial connection 38. The power supply/communication block 37 receives power from the secondary of an isolation transformer (e.g., an L-830 model). The communication signal is coupled through this isolation transformer. The load on the isolation transformer is switched at either output load A or output load B.

Figure 4A:
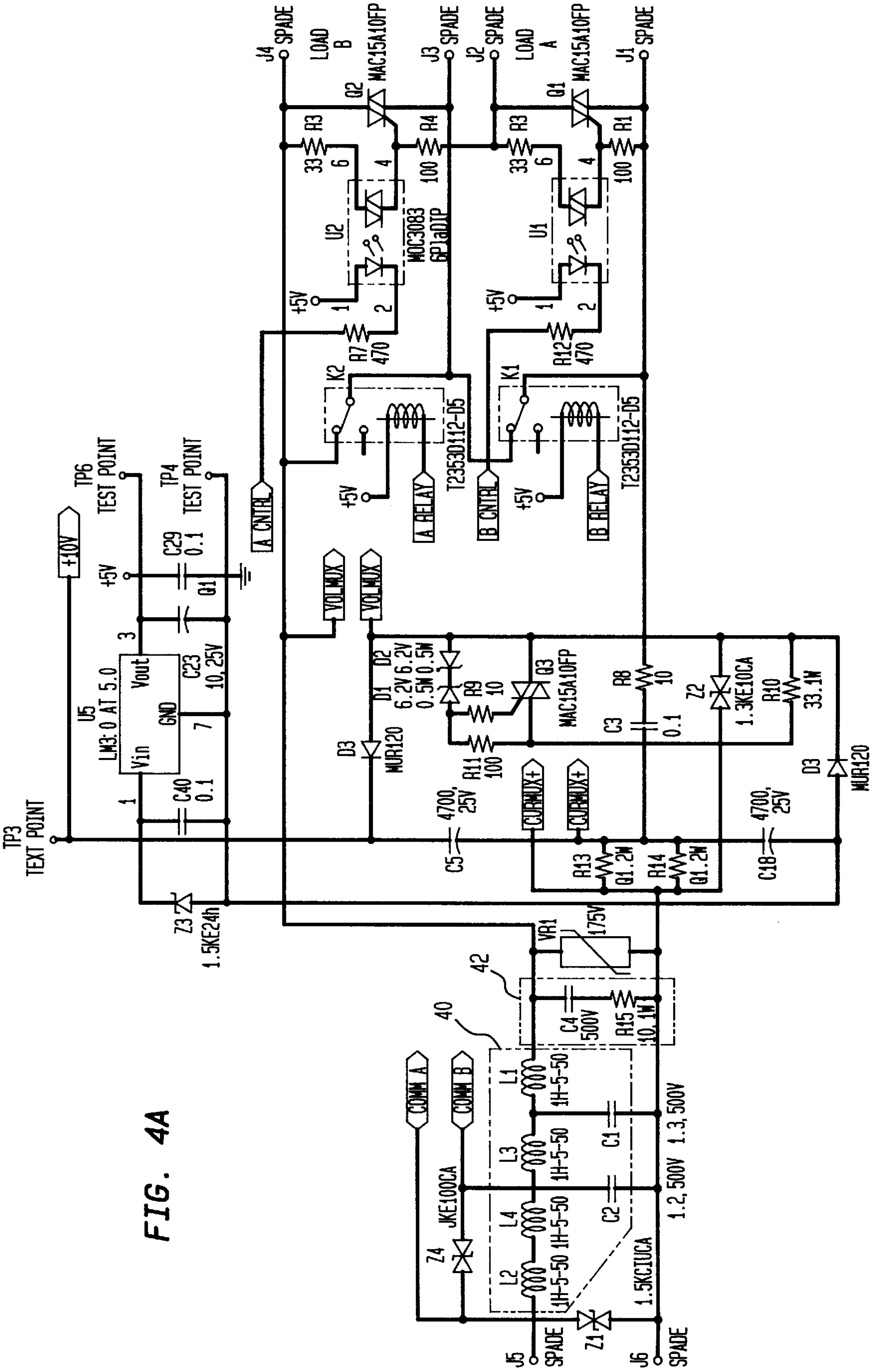
FIG. 4*a* is a schematic diagram of high current circuitry of a power supply and communications board in accordance with an exemplary embodiment of the present invention.
Figure 4B:
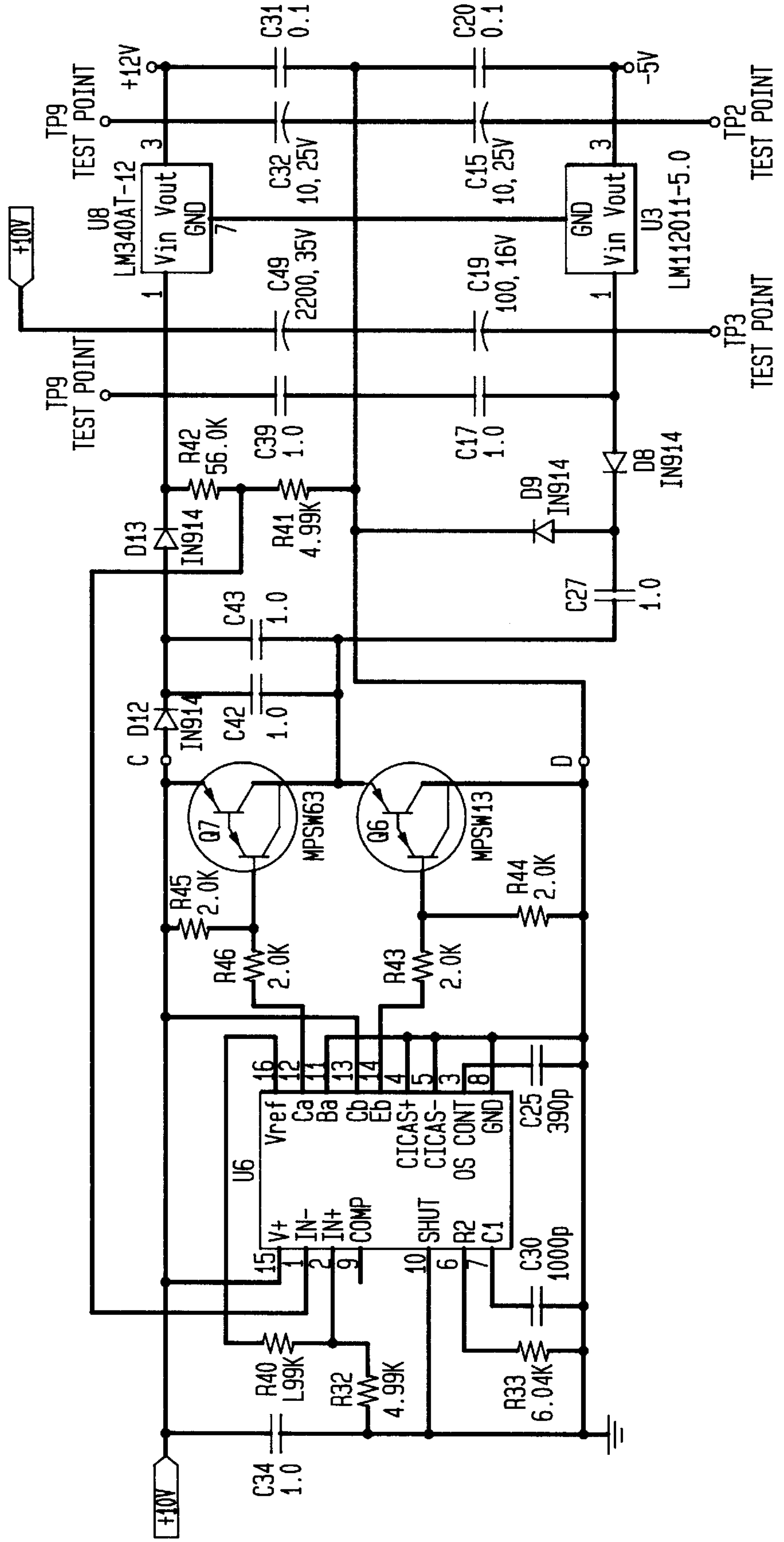
FIG. 4*b* is a schematic diagram of charge pump circuitry of a power supply and communications board in accordance with an exemplary embodiment of the present invention.
Figure 4C:
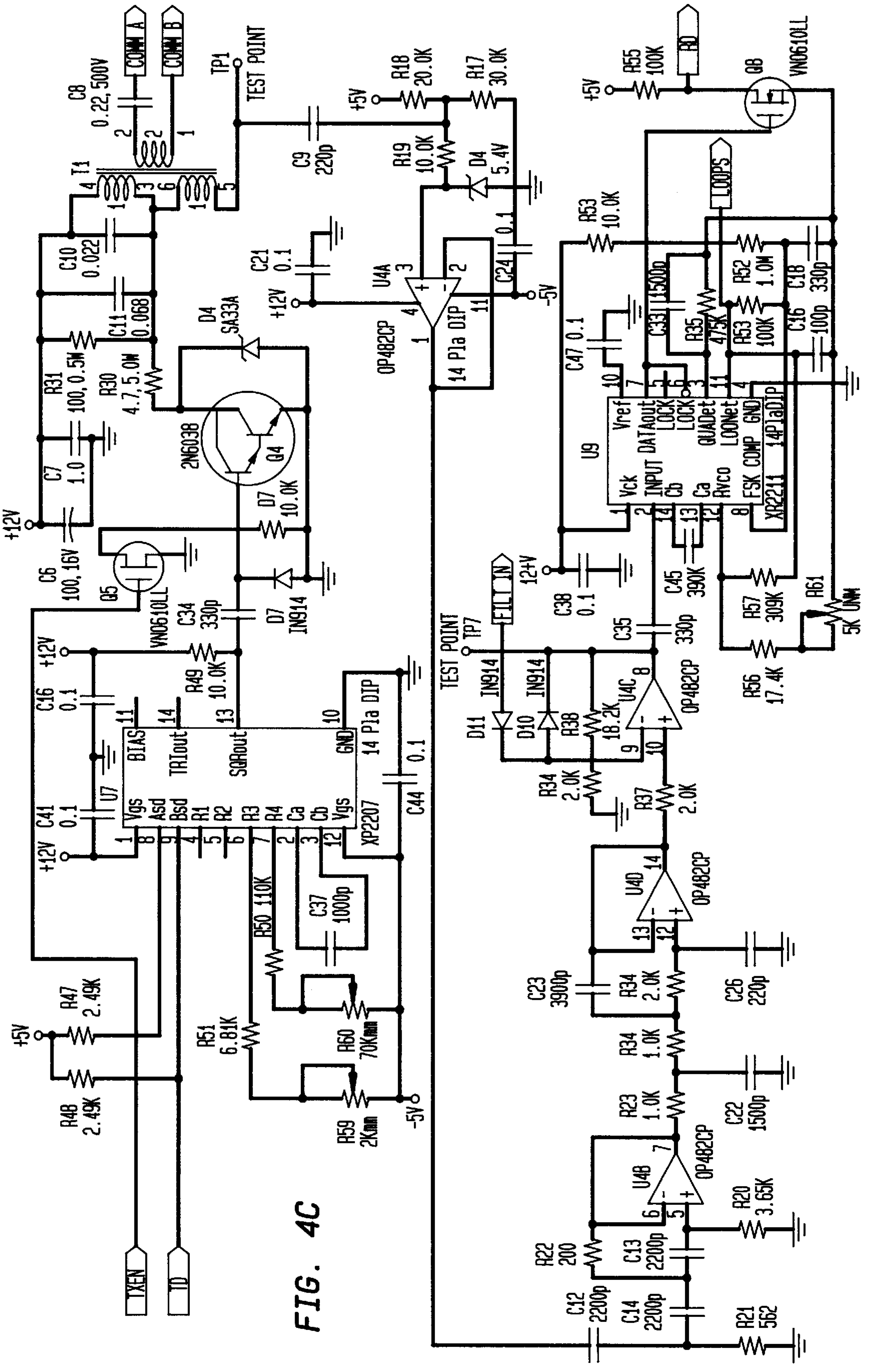
FIG. 4*c* is a schematic diagram of high frequency signal generation and detection circuitry of a power supply and communications board in accordance with an exemplary embodiment of the present invention.

FIGS. 4*a*–4*c* provide details on the internal structure of the power supply and communications board. Table 1 shows component values for an exemplary embodiment of the present invention as described below with respect to FIGS. 4*a*–4*c*.

TABLE 1

| Component | Value | Units |
|---|---|---|
| D1, D2 | 6.2 (at 0.5 W) | V |
| D3, D5 | MUR120 | |
| D4 | 5.6 | V |
| D7, D8, D9, D10, D11, D12, D13 | 1N914 | |
| L1, L2, L3, L4 | 50 | μH |
| VR1 | 175 | V |
| Z1 | 200 | V |
| Z2 | 13 | V |
| Z3 | 24 | V |
| Z4 | 100 | V |
| R1, R4, R11 | 100 | Ω |
| R3, R5 | 33 | Ω |
| R7, R12 | 470 | Ω |
| R8, R9 | 10 | Ω |
| R10 | 33 (at 1 W) | Ω |
| R13, R14 | 0.1 | Ω at 2 Watts |
| R15 | 10 (at 100 W) | Ω |
| R17, R18 | 20.0 | kΩ |
| R19, R29, R53, R49, R55 | 10.0 | kΩ |
| R20 | 3.65 | kΩ |
| R21 | 562 | Ω |
| R22 | 200 | Ω |
| R25, R34, R36 | 1.0 | kΩ |
| R30 | 4.7 (at 0.5 W) | Ω |
| R31 | 100 (at 0.5 W) | Ω |
| R32, R40, R41 | 4.99 | kΩ |
| R33 | 6.04 | kΩ |
| R35 | 475 | kΩ |
| R37, R39, R43, R44, R45, R46 | 2.0 | kΩ |
| R38 | 18.2 | kΩ |
| R42 | 56.0 | kΩ |
| R47, R48 | 2.49 | kΩ |
| R50 | 110 | kΩ |
| R51 | 6.81 | kΩ |
| R52 | 1.0 | MΩ |
| R56 | 17.4 | kΩ |
| R57 | 309 | kΩ |
| R58 | 100 | kΩ |
| R59 | 2 | kΩ |
| R60 | 20 | kΩ |
| R61 | 5 | kΩ |
| C1, C2, C4 | 1.2 (at 500 V) | μF |
| C3, C7, C17, C27, C39, C42, C43 | 1.0 | μF |
| C5, C18 | 4700 (at 25 V) | μF |
| C6, C19 | 100 (at 16 V) | μF |
| C8 | 0.22 (at 500 V) | μF |
| C9, C26 | 220 | pF |
| C10 | 0.022 | μF |
| C11 | 0.068 | μF |
| C12, C13, C14 | 2200 | pF |
| C15, C23, C32 | 10 (at 25 V) | μF |
| C16, C20, C21, C24, C29, C31, C38, C40, C41, C44, C47 | 0.1 | μF |
| C22, C33 | 1500 | pF |
| C25, C45 | 390 | pF |
| C28 | 3900 | pF |
| C30, C37 | 1000 | pF |
| C34 | 1.0 | pF |
| C35, C36, C48 | 330 | pF |
| C46 | 100 | pF |
| C49 | 2200 (at 35 V) | μF |

FIG. 4*a* shows the high current (up to 6.6 A) sections of the circuit. The isolation transformer secondary is connected at lugs J6 and J5. The transmit and receive communication signals comm A and comm B are coupled to the power loop at terminal J5. Current initially flows from lug J5, through a filter 40 formed by inductors L2, L4, L3 and L1 and capacitors C1 and C2. This filter removes or at least reduces high-frequency interference components from the current signal. The current is then applied to shunting relays K2 and K1 which may be, for example, T75S5D112-05 relays manufactured by Potter and Brumfield (shown de-energized). The relays K1 and K2 allow current to be selectively applied either to load A, load B or both. Current is initially applied when a relay is energized. After the current passes through the relays K2 and K1 (or load A and load B), it flows through high speed diode D3, energy storage capacitor C5 and resistors R13 and R14 and finally out of lug J6. This charges capacitor C5. During the negative part of the AC cycle, current initially flows from lug J6, resistors R13 and R14, energy storage capacitor C18, high speed diode D5, contacts at relays K1 and K2, inductors L1–L4 and finally out of lug J5. This charges capacitor C18.

Surge protection on the isolation transformer secondary is provided by Zener diode Z1. The communication signal is protected by Zener diode Z4. Capacitor C2 has a low impedance to the communication signal and provides the return path for the communication signal back to lug J6. The inductor/capacitor combination L3-C1-L1 has a high impedance to the communication signal and is intended to prevent it from propagating into undesired sections of the circuit. Q1 and Q2 which may be, for example, MAC15A10FP triacs manufactured by Motorola, are used to short out the lamp terminal when an open lamp condition is detected by the remote processor load. Inductor/capacitor combinations L1-C1 and L3-C2 form a two stage electromagnetic interference (EMI) filter to eliminate or at least reduce interfering noise that may couple into the communication circuitry.

Metal-oxide varistor VR1, which may be for example, manufactured by Harris Semiconductor, provides surge protection for load A and load B. The snubber 42 comprising capacitor C4 and resistor R15 is used by triacs Q1 and Q2 to limit the rate of voltage rise and prevents or reduces false triac triggering, especially if there is a 500 W load. The high speed diode D3, energy storage capacitor C5 and resistors R13 and R14 make up a part of the current and voltage sensing circuit. A voltage developed across resistors R13 and R14 represents the current flowing in the secondary of the isolation transformer. This voltage is sent to the analog detection circuitry in FIG. 5*c* via signals "CurMon+" and "CurMon−". The voltage that is present across lugs J1 to J4 (which represents the voltage across the secondary of the isolation transformer) is also sent to the analog detection circuitry in FIG. 5*c* via signals "VolMon+" and "VolMon−".

Load A is connected across lugs J1 and J2 and load B is connected across lugs J3 and J4. At turn-on, relays K1 and K2 are deenergized which places a short across the load. This insures that power is available at turn-on, even if a lamp is open. Relays K1 and K2 are intended to prevent an open circuit from being present on the L-830/L-831 current isolation transformer secondary which should increase communication reliability. The relays K1 and K2 are never switched when current is supplied to their contacts, thereby preserving and extending the life of the relay contacts. Optical isolators U2 and U1 which may be, for example, M0C3083 optical isolator triacs manufactured by Motorola, place a short across loads A and B, respectively, if load A or load B is open.

Depending upon initial current flow, capacitor C5 or capacitor C18 rises to 8 V and triggers triac Q3 via Zener diodes D2 and D1 and resistor R9. For the remainder of the AC cycle, the AC current then flows through triac Q3 which may be, for example, a MAC15A10FP triac manufactured by Motorola. This effectively bypasses the D3-C5 and D5-C18 circuitry, limiting the maximum voltage across the energy storage capacitors. As current reverses direction, a similar action occurs on the other capacitor. The resulting DC output voltage across capacitor combination C5-C18 is on the order of 10 to 12 V DC.

If the voltage across capacitor combination C5-C18 drops to less than about 8.8 V DC, it is assumed that the power supply has failed or that there is an open-circuit on the isolation transformer secondary.

An open circuit detection signal is also sent to the microprocessor. It should be noted that at turn-on, if the load (such as a lamp) is open, the processor board tries to restart the load three times using signals "ACNTRL Not" or "BCNTRL Not". This is done once every 10 seconds. The processor board then assumes the lamp is open and does not try again until the power is re-cycled.

The actual triac pair is Q2 and Q1. Two different lights may be connected to a single remote. If a lamp opens, there will be a spike on the output of the isolation transformer, because the transformer tries to maintain 6.6 A through the lamp. At zero crossing, an isolation transformer saturates if it is open. This may result in spikes as high as 700 V peak, which can cause arcing problems. Thus, if an open circuit is detected, then the secondary of the transformer is shorted to prevent or at least reduce current surges.

Capacitor C3 and resistors R8 and R10 dampen the rise of AC current in the circuit. Zener diode Z2 is intended to protect triac Q3 from surges.

The DC output voltage is surge-protected with Zener diode Z3 and is input into a five-volt three-terminal regulator U5 which may be, for example, a LM340AT-5 linear regulator manufactured by National Semiconductor, to generate a regulated +5 V DC. The unregulated 10–12 V DC (at 500 mA) is also sent to other on-board regulators at power connection point "+10 V" (see FIG. 4*b*).

The sequence of load switching is as follows. The microprocessor is powered up and performs a self-test. The microprocessor then pulls signal "ACNTRL Not" and "BCNTRL Not" low. This turns on optically coupled triacs U1 and U2. Either triac Q1 or Q2 is then turned on which effectively shorts the load. When a command is given to turn on the load (such as a lamp), relays K1 and K2 are energized and the appropriate triac Q1 or Q2 is turned off. Current then flows through the load.

FIG. 4*b* is a charge pump circuit which acts as a DC power supply. The circuit contains a regulator chip U6 which may be, for example, a CA1524E switching power supply manufactured by Harris, which acts as an inverter oscillator and Darlington pairs Q6 and Q7 that double the DC voltage supplied to the circuit and provides a negative voltage. Regulators U3 and U8 are the output regulators which may be, for example, a LM120 regulator manufactured by National Semiconductor, and a LM340AT-12 regulator manufactured by National Semiconductor, respectively.

10 to 12 V DC is provided into the charge pump circuit from the connection point "+10 V" (from FIG. 4*a*). A circuit produces a square wave at the cathode of D12 with a lower limit of +10 V and an upper limit of +20 V. During the positive phase of the square wave, current flows through D13 to develop a potential of approximately +18 V across capacitor C19. The regulator provides an output of +12 V at 500 mA peak.

The circuit provides −9 V at the cathode of diode D8. The 9 V DC is regulated by output regulator U3 to provide an output of −5 V DC at 100 mA.

An output overvoltage is detected at the junction of resistors R42 and R41 and is fed back into the regulator U6. An overvoltage will shut down regulator U6, protecting the rest of the circuitry in the remote.

Referring to FIG. 4*c*, there is shown a schematic for the high frequency signal generation and detection circuitry.

With regard to the input path of the circuit, when the master control module transmits a communication signal “Comm A” or “Comm B”, the signal is coupled through the high frequency coupling transformer T1 and provided into T1 tap 1-2 via capacitor C8. The signal is then present across taps 4 to 5 which results in an overall turns ratio of 1:1. The signal is then amplified and filtered four times by amplifiers U4A, U4B, U4D and U4C, as follows. The signal is provided into buffer U4A via capacitor C9. Capacitor C9 is used to limit low frequency noise. The resistor pair R18 and R17 sets the received signal around 2.5 V. The buffered signal goes to high pass filter U4B and then to low pass filter U4D. The resulting signal is sent to limiter U4c which prevents or at least reduces the effect of random high amplitude signals passing through to FSK detector U9. The resistor R61 is tuned to set the voltage controlled oscillator (VCO) internal to FSK detector U9 which may be, for example, a XR2211FSK detector manufactured by EXAR, to the FSK center frequency (125 KHz). The resulting receive signal is buffered, logic level shifted and inverted by transistor Q8. The transistor Q8 then sends the signal to the microprocessor at the receive data terminal “RD”.

With regard to the output path of the circuit, an FSK generator U7 which may be, for example, a XR2207 FSK generator manufactured by EXAR, and the surrounding circuitry generate the communication signals when a remote transmits to the master control module. The transmitted frequency selection is controlled by the microprocessor via the transmit enable signal “TXEN” and the transmit data signal “TD”. The high and low FSK frequencies are at 129 KHz and 121 KHz. A potentiometer R59 sets the low frequency of 121 KHz. A potentiometer R60 sets the delta (8 KHz) in order to achieve 129 KHz. For example, If “Asel” (pin 8) on generator U7 is low then the resistance connected at “R3” (pin 6) in parallel with “R4” (pin 7) of generator U7 is selected for transmission. When “Asel” is high, no resistance is selected and the device does not oscillate. When “Bsel” (pin 9) is high, timing pins “R3” and “R4” are selected in parallel. If “Bsel” is low then only the resistance connected at “R3” is used to select the transmission frequency.

The output of FSK generator U7 (with an amplitude that varies between +5 V to −5 V) is taken to the base of a Darlington transistor Q4 for amplification. The transistor Q4 drives high frequency transformer T1 tap 3-4 and the connected circuit components. The transformer T1 provides a 2:1 step-up and is outputted at tap 1-2. The transmit signal is coupled through capacitor C8 and inductors L2 and L4 (in FIG. 4*a*) into the secondary of the isolation transformer. The communication signal passes through the isolation transformer and is broadcast to the master control module in the vault.

When the remote is not transmitting, transistor Q5 is turned on to prevent spurious output signals from being provided by generator U7. Transistor Q5 ties the base of transistor Q4 to a logic-low state.

Figures 1, 5A:
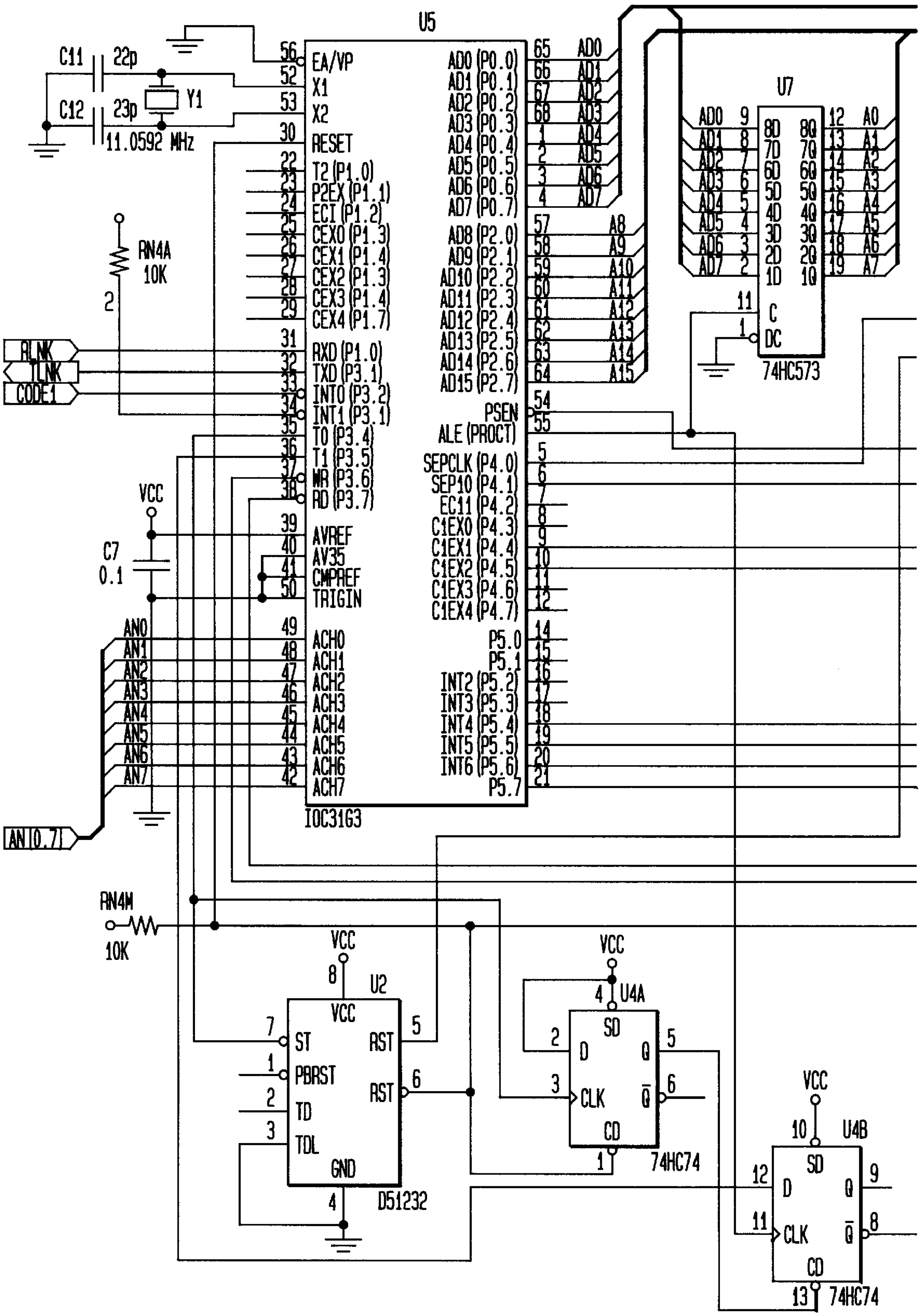
FIG. 5*a* is a schematic diagram of the microprocessor and components of a processor board in accordance with an exemplary embodiment of the present invention.
Figures 2, 5A:
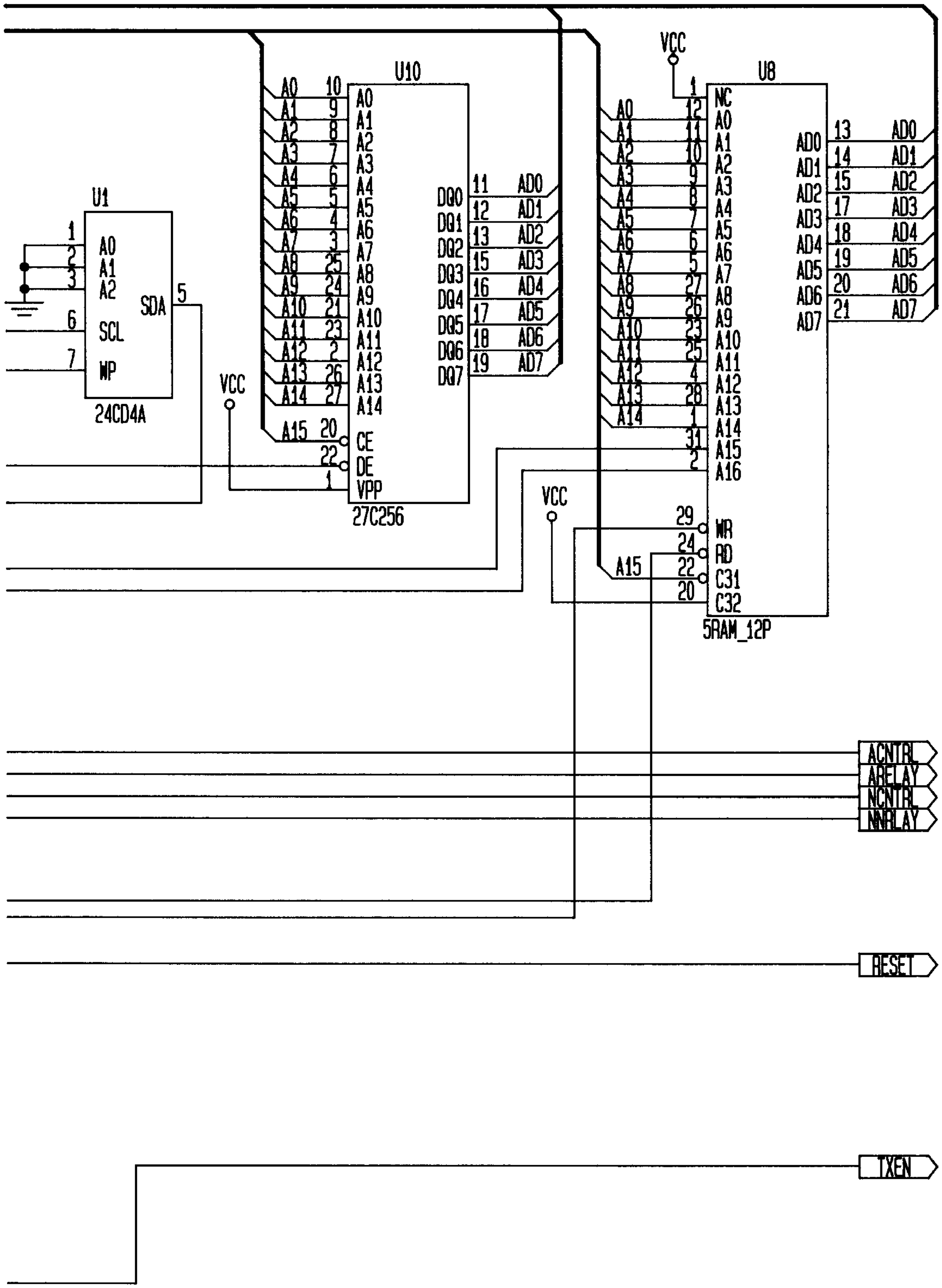
Figure 5B:
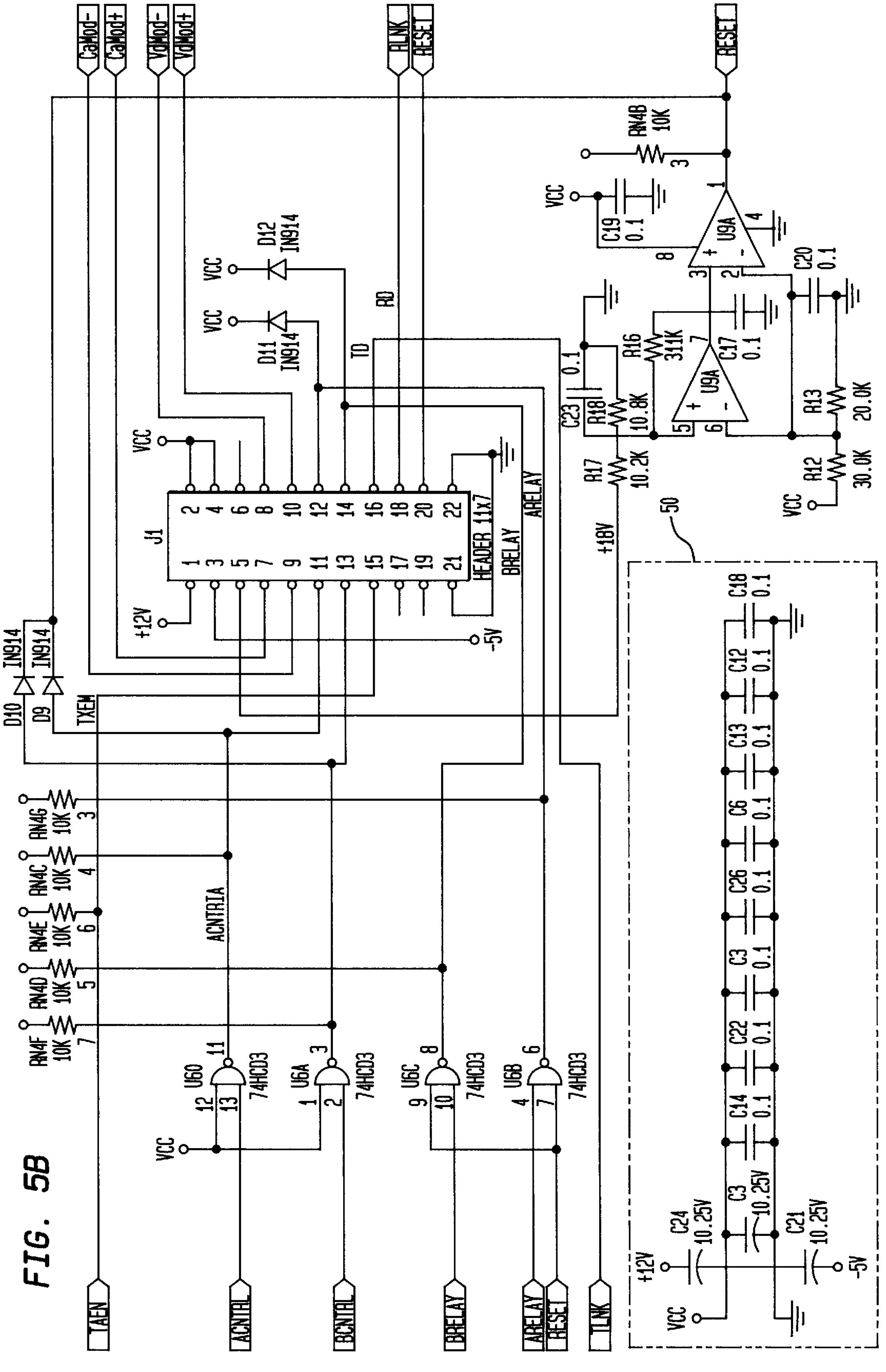
FIG. 5*b* is a schematic diagram which shows intermediate connection circuitry of a processor board in accordance with an exemplary embodiment of the present invention.
Figure 5C:
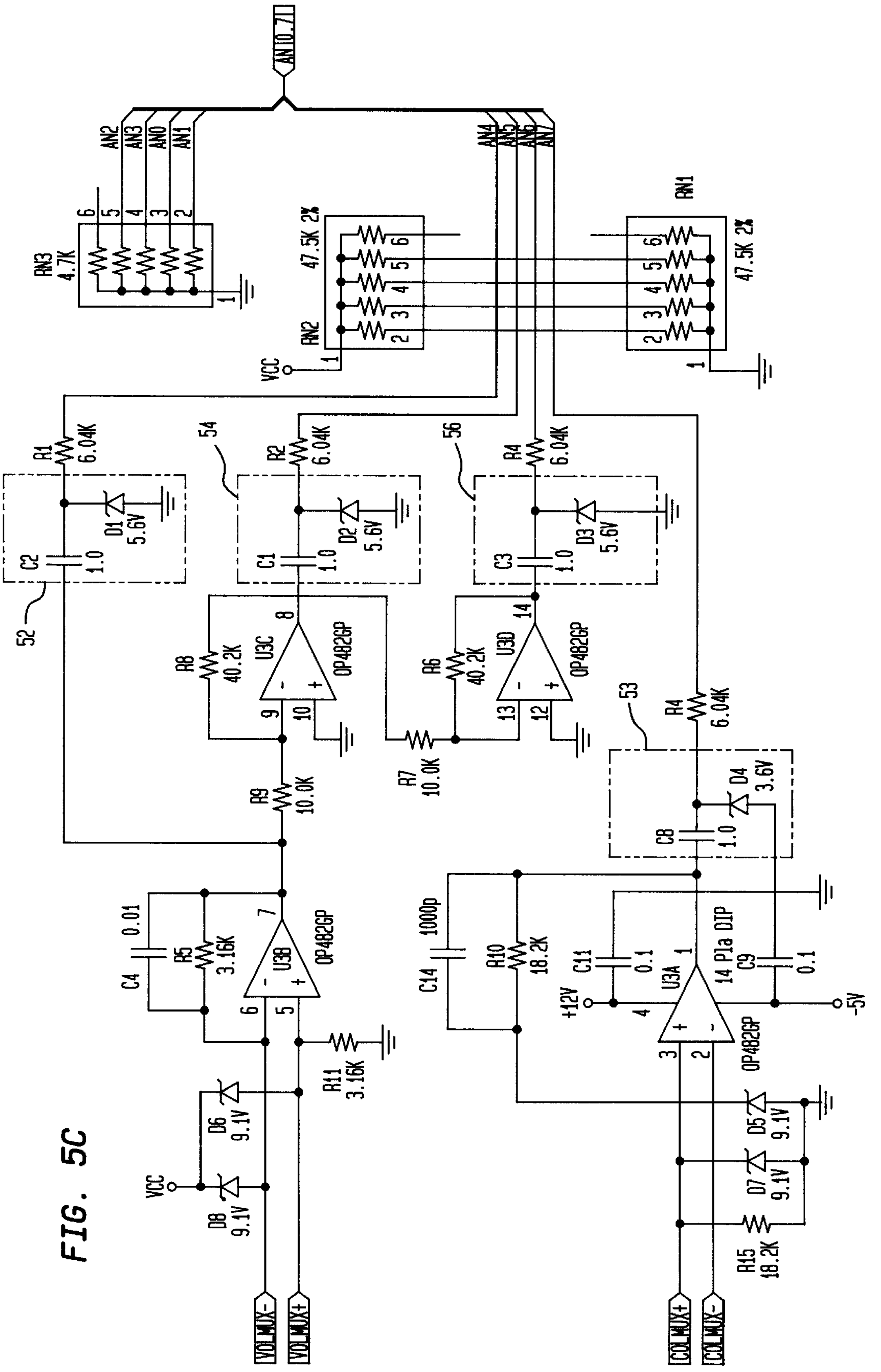
FIG. 5*c* is a schematic diagram which shows the interface circuitry of a processor board in accordance with an exemplary embodiment of the present invention.

FIGS. 5*a*–5*c* provide details on the internal structure of the processor board for the remote controller 6. Table 2 shows component values for an exemplary embodiment of the present invention with respect to FIGS. 5*a*–5*c*.

TABLE 2

| Component | Value | Units |
|---|---|---|
| D1, D2, D3, D4 | 5.6 | V |
| D5, D6, D7, D8 | 9.1 | V |
| D9, D10, D11, D12 | 1N914 | |
| RN1, RN2 | 47.5 | kΩ |
| RN3 | 4.7 | kΩ |
| RN4A, RN4B, RN4C, RN4D, RN4E, RN4F, RN4G, RN4H | 10 | kΩ |
| R1, R2, R3, R4 | 6.04 | kΩ |
| R5, R11 | 3.16 | kΩ |
| R6, R8 | 40.2 | kΩ |
| R7, R9 | 10.0 | kΩ |
| R10, R15 | 18.2 | kΩ |
| R12 | 30.0 | kΩ |
| R13, R14 | 20.0 | kΩ |
| R16 | 511 | kΩ |
| R17 | 40.2 | kΩ |
| C1, C2, C3, C8, C17 | 1.0 | μF |
| C4 | 0.01 | μF |
| C5, C6, C7, C9, C11, C12, C13, C16, C18, C19, C20, C22, C23, C26 | 0.1 | μF |
| C10, C15 | 22 | pF |
| C14 | 1000 | pF |
| C21, C24, C25 | 10 (at 25 V) | μF |

FIG. 5*a* is a standard microprocessor circuit containing a microprocessor U5 and associated components. Microprocessor U5 may be, for example, an 80C51GB microcontroller manufactured by Intel Corp. U10 may be a 27C256 EPROM which is manufactured by Hitachi. In the exemplary embodiment of the invention, U10 is used to hold program code for the microprocessor U5. Element U8 may be a RAM and element U7 may be, for example, a 74HC573 databus buffer manufactured by Harris. Element U1 may be a serial electronically erasable programmable read only memory (EEPROM) which is used for nonvolatile storage of configuration data. It should be noted that data analog inputs are provided analog channels ACH[0] to ACH[7] of the microprocessor U5.

Element U2, which may be, for example, a DS1232 watchdog timer manufactured by Dallas Semiconductor, is a watchdog timer that detects if any activity has taken place in a certain predetermined period of time. U2 performs two tasks. First, it receives the watchdog signal from microprocessor U5. Second, it inhibits transmission of signals during a reset operation via U4A which may be, for example, a 74HC74 dual D-type flip-flop manufactured by Harris.

FIG. 5*b* is a ribbon cable connector. The connector passes the “CurMon−”, “CurMon+”, “VolMon−”, “VolMon+” and the +10 V signal which is used to generate the “OCDET” (open circuit detection) signals. A bypass capacitor circuit 50 is provided.

FIG. 5*c* shows the interface circuitry for interfacing the analog current or voltage on the secondary of the isolation transformer with the microprocessor.

With respect to current, current signals “CurMon+” and “CurMon−” are derived from the voltage across the resistors R13 and R14 (from FIG. 4*a*). This voltage, which represents the current through the load, is input into buffer U3A. The clamp 53, consisting of capacitor C8 and Zener diode D4, prevents overvoltages on signal AN7 from damaging the microprocessor at terminal ACH7.

With respect to the voltage sensors, the voltage that is sensed across the lamps has a wide dynamic range. Voltage signals “VolMon+” and “VolMon−” are differentially input into buffer U3B. Zener diodes D8 and D6 limit the peak voltage which may be input into buffer U3B. The voltage could be as low as 2 volts RMS and it could be as high as 75 volts RMS with a peak voltage of 225 V or more. Because of the wide dynamic range of the isolation transformer secondary voltage, a circuit is employed to measure the signal more accurately. The output of buffer U3B is switched using the circuitry of FIG. 5*c* to keep it within a limited range. The signal level is transformed into three overlapping ranges which are provided into the microprocessor where they are digitized. Selection of which of these three outputs to use is based on autoranging software in the microprocessor. The algorithm first examines the highest output (i.e. lowest current) range. If it is at full scale, the next lower range is selected.

As described above, the output of buffer U3B is divided into three circuits, each providing a different level of modification. The first level of modification does not amplify the system. It includes a clamp circuit 52 consisting of capacitor C2 and Zener diode D1 which are intended to prevent temporary overvoltage conditions from damaging the microprocessor. The signal is output at terminal "AN4". The second level of modification includes amplification by a factor of four via amplifier U3C and the clamp circuit 54 consisting of capacitor C1 and Zener diode D2. The signal is output at terminal "AN5". The third level of modification includes amplification by a factor of 16 and is obtained further amplifying the output signal of U3C by a factor of four via amplifier U3D. The third level also includes a clamp circuit 56 consisting of capacitor C3 and Zener diode D3. The output signal of the third level is provided at terminal "AN6".

Resistors RN1 and RN2 level shift the voltage and current signals before they are sent to the microprocessor. Both the current and voltage signals are provided into an 8 bit A–D converter spanning 5 V DC. These signals are periodically sampled and a RMS algorithm is performed, as is known to those skilled in the art.

It is contemplated that the processor board of the remote controller 6 may also include I/O interfaces to allow the processor to interface with external sensors. An interface with a separate communications link may also be added to the processor board. One possible implementation of these circuits is described above in the description of the master processor board.

FIGS. 6*a*–6*d* provide details on the internal structure of the master processor board. Table 3 shows component values for an exemplary embodiment of the present invention with respect to FIGS. 6*a*–6*d*.

TABLE 3

| Component | Value | Units |
|---|---|---|
| D1, D2, D3, D5 | 5.6 | V |
| D4 | SA33A | |
| D6 | 30 | V |
| D7, D9, D10 | 1N914 | |
| D8 | 9.1 | V |
| RN1A, RN1B, RN1C, RN1D, RN1E, RN1F, RN1G, RN1H | 10 | kΩ |
| RN2A, RN2B, RN2C, RN2D, RN2E, RN2F, RN2G, RN2H, RN2I | 10 | kΩ |
| RN3A, RN3B, RN3C | 10 | kΩ |
| RN4A, RN4B, RN4C, RN4D | 4.7 | kΩ |

TABLE 3-continued

| Component | Value | Units |
|---|---|---|
| R1 | 20 | kΩ |
| R2 | 1 | kΩ |
| R3 | 6.81 | kΩ |
| R4 | 110 | kΩ |
| R5, R6, R17, R19 | 4.7 | kΩ |
| R7, R8, R9, R10 | 56 | kΩ |
| R11, R13, R14, R16 | 1 | kΩ |
| R12, R15 | 120 | Ω |
| R18, R20, R32, R34 | 10.0 | kΩ |
| R21 | 4.7 (at 0.5 W) | Ω |
| R22, R23, R35, R37, R40 | 1.0 | kΩ |
| R24 | 100 (at 0.5 W) | Ω |
| R25 | 17.4 | kΩ |
| R26 | 312 | kΩ |
| R27, R43, R44 | 10 | kΩ |
| R28 | 100 | kΩ |
| R29 | 470 | kΩ |
| R30 | 11.8 | kΩ |
| R31 | 1.0 | MΩ |
| R33 | 63.4 | kΩ |
| R36 | 5 | kΩ |
| R38 | 561 | Ω |
| R39, R45 | 2.0 | kΩ |
| R41 | 18.2 | kΩ |
| R42 | 3.65 | kΩ |
| R46 | 200 | Ω |
| C1 | 0.1 | μF |
| C2, C17 | 1.0 | μF |
| C3, C12, C18 | 15 (at 16 V) | μF |
| C4, C5, C8, C10, C24, C25, C31, C33, C34, C35, C36, C37, C38, C39, C42, C43, C45 | 0.1 | μF |
| C6 | 1000 | pF |
| C7, C16, C19 | 330 | pF |
| C9 | 0.022 | μF |
| C11 | 0.068 | μF |
| C13 | 390 | pF |
| C14 | 100 (at 16 V) | μF |
| C15 | 100 | pF |
| C20, C23 | 1500 | pF |
| C21 | 100 | pF |
| C22 | 0.1 | μF |
| C26 | 3900 | pF |
| C27, C28, C30 | 2200 | pF |
| C29 | 220 | pF |
| C32 | 1.0 | μF |
| C40, C41 | 22 | pF |
| C44 | 0.1 | μF |

Figures 1, 6A:
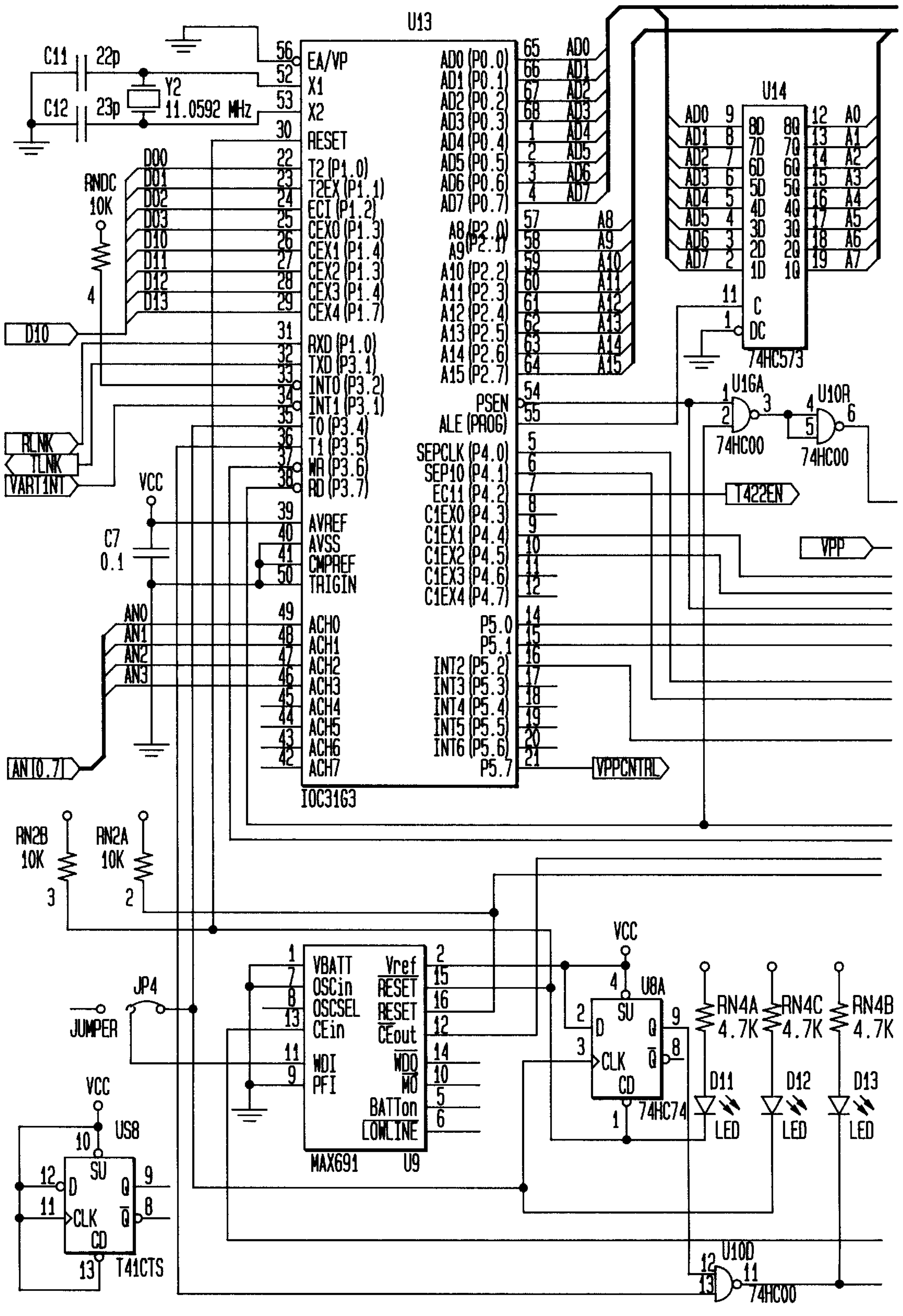
FIG. 6*a* is a schematic diagram of a microprocessor and components of a master board in accordance with an exemplary embodiment of the present invention.
Figures 2, 6A:
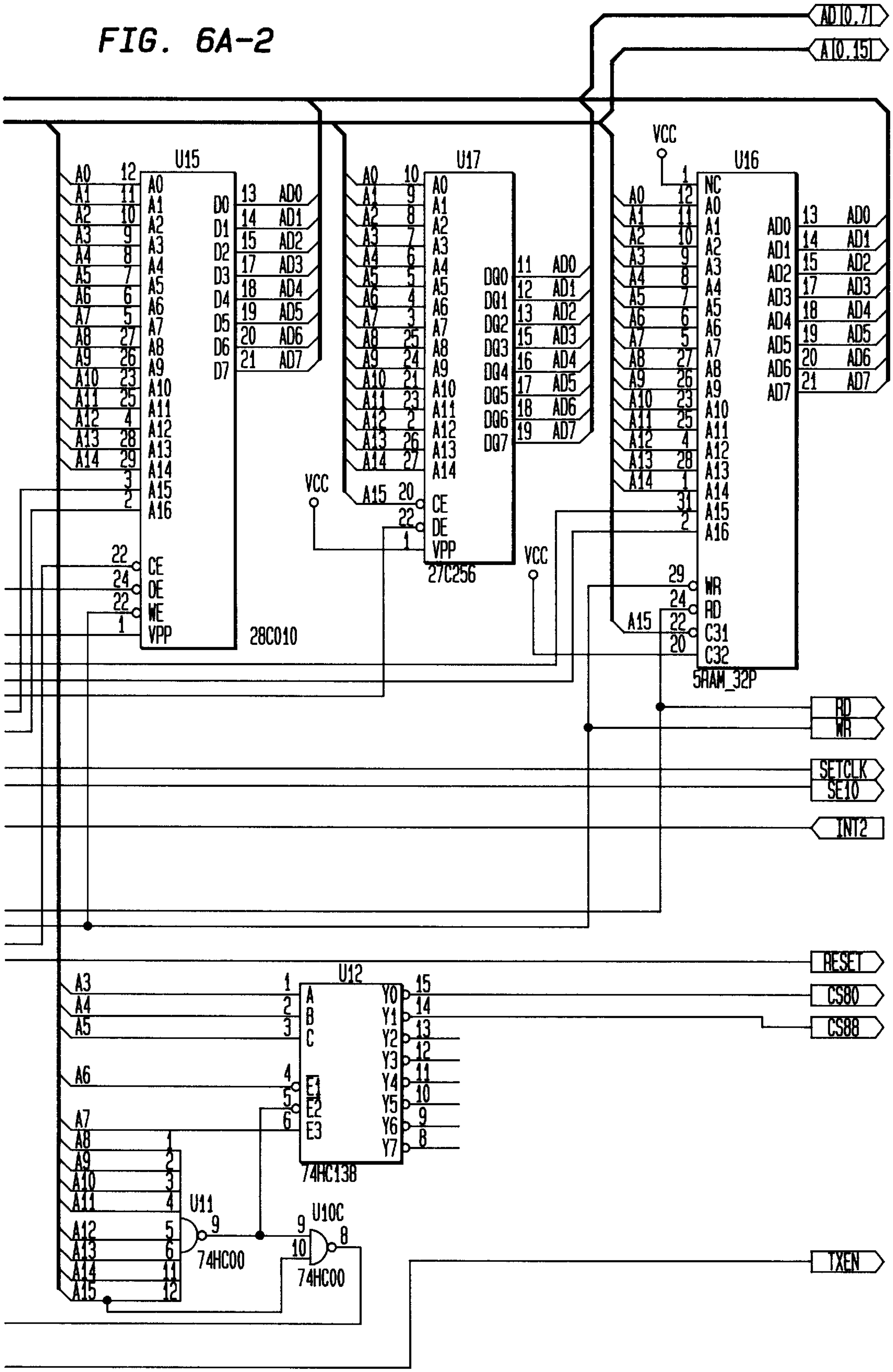

FIG. 6*a* is a standard microprocessor circuit, similar to FIG. 5*a*, containing a microprocessor U13 and associated components. Component U15 which may be, for example, a 28F010 flash memory manufactured by Intel, is used to store the master configuration data. Component U17 is a 27C256 ultraviolet erasable programmable read only memory (UVEPROM) that is used for program storage, and component U16 is a random access memory (RAM). Element U14 is a databus buffer circuit.

Component U9, which may be, for example, a MAX691 watchdog timer manufactured by Maxim, is a watchdog timer that detects if any activity has taken place in a certain predetermined period of time. U9 performs two tasks. First, it receives the watchdog signal from microprocessor U13 via jumper JP4. Second, it inhibits transmission of signals during a reset operation via U8A which may be, for example, a 74HC74 dual D-type flip-flop manufactured by Harris, and U10D, to better ensure that the DC power supply comes up to full value before the system is used.

Three LEDs are provided to indicate status. LED D12 indicates reset, LED D1 indicates watchdog operation and LED D13 indicates that transmission has been enabled.

Figure 6B:
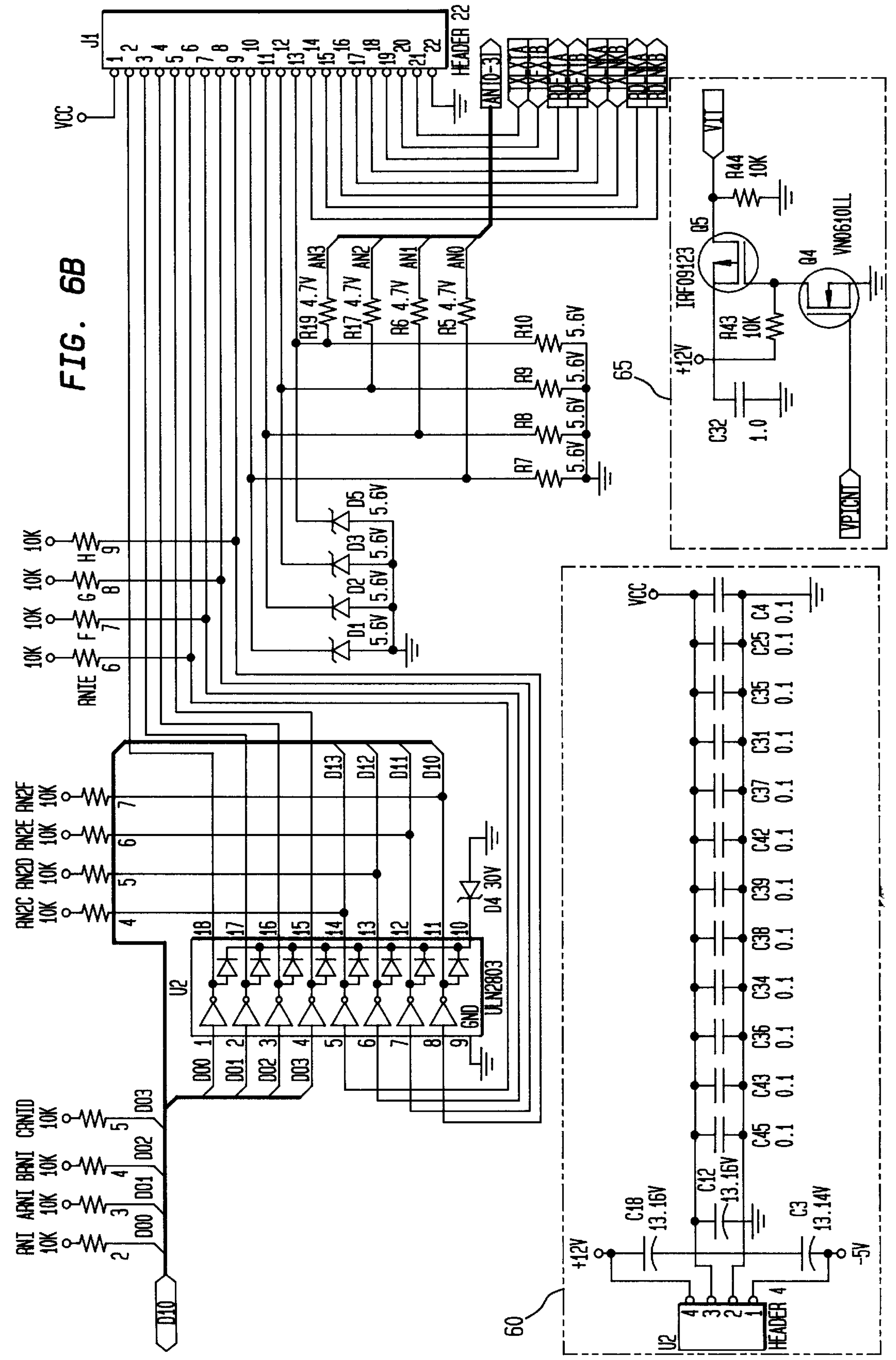
FIG. 6*b* is a schematic diagram which shows the I/O circuitry of a master board in accordance with an exemplary embodiment of the present invention.

Referring to FIG. 6*b*, there is shown I/O circuitry. J1 provides a port for connection of I/O signals. External dedicated closed contacts, such as a relay, are connected at J1 pins 6–9. The common at pin 22 is connected to the dedicated closed contact and is returned via pins 6 to 9. Up to four analog signals are input at J1 pins 10–13. These signals are scaled by the voltage dividers formed by resistors R5, R6, R17, R19, R7, R8, R9 and R10 and the scaled potentials are peak limited by diodes D1, D2, D3 and D5. The resulting signals, AN0 to AN3, are applied to the microprocessor U13, via channels AN[0] to AN[3] (see FIG. 6*a*). Optional external serial links are connected at J1 pins 14–21.

Resistors RN1E-H pull an I/O input up to +5 V when no contact closure is present. The resulting I/O signal is provided into buffer U2 which may be, for example, a ULN2803 Darlington transistor array manufactured by Sprague. The buffered signals are then sent to the microprocessor (see FIG. 6*a*). Output I/O signals are buffered by U2 before being output at J1 pins 2–5.

The circuit 65 containing transistors Q4 and Q5 switch 12 V to the flash memory U15 through signal "VPPCNTRL" (see FIG. 6*a*). A bypass capacitor circuit 60 is also provided.

Figure 6C:
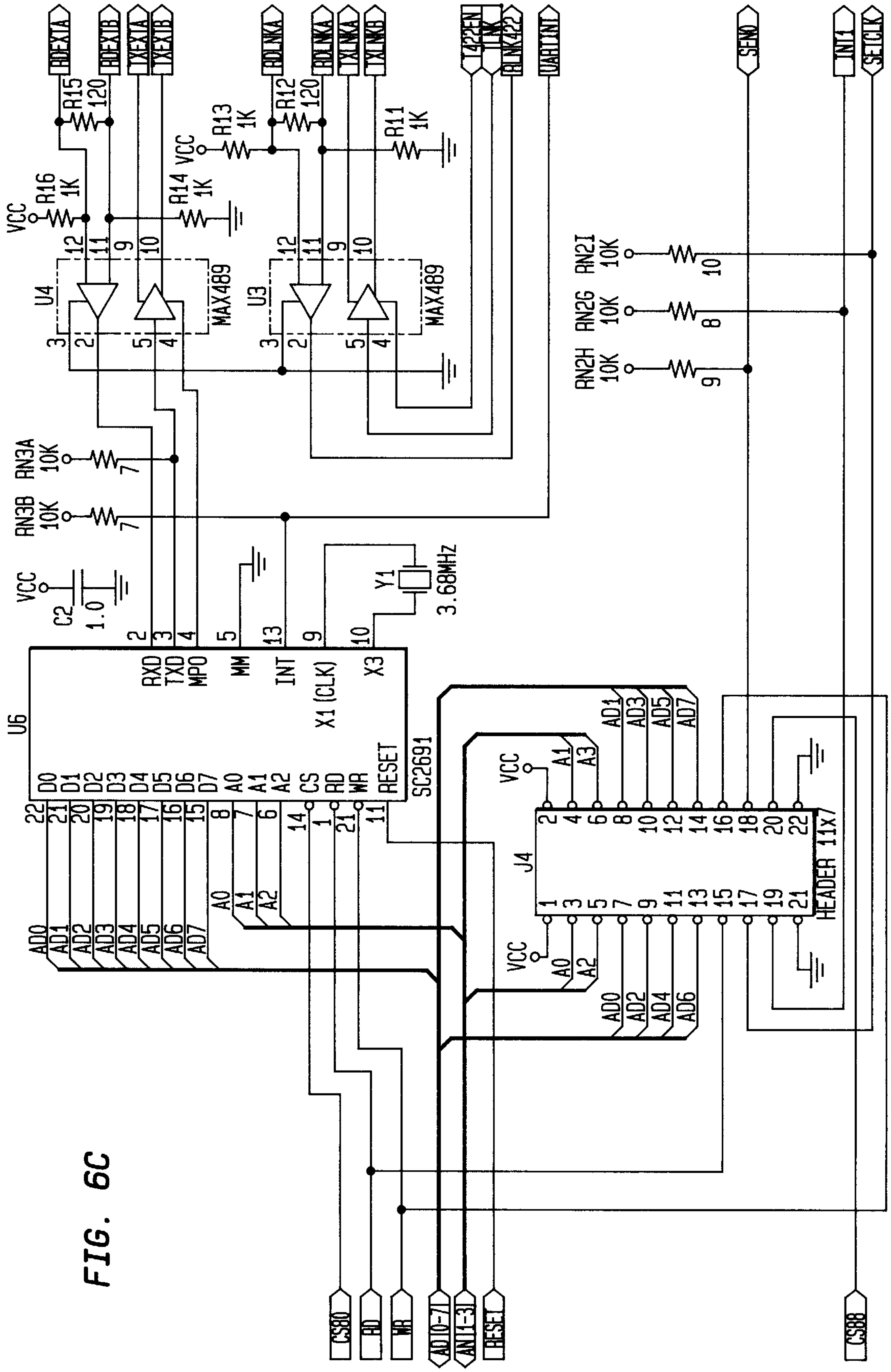
FIG. 6*c* is a schematic diagram which shows circuitry used by a master board to communicate with a vault computer in accordance with an exemplary embodiment of the present invention.

FIG. 6*c* shows a serial data link to the vault computer. A universal asynchronous receiver transmitter (UART) U6 which may be, for example, a SC2691 UART manufactured by Signetics, is generally only used on the master to communicate with the vault computer. In a remote, it is optionally used to provide a separate bi-directional communication link. This configuration is desirable when communicating with remotes without using the series circuit.

UART U6 is connected to serial interfaces U3 and U4 which may be, for example, a MAX489 serial interface manufactured by Maxim. As an example, an RS-422 interface could be used to communicate between the master and the remotes.

Connector J4 provides a connection for an optional I/O expansion port.

Figure 6D:
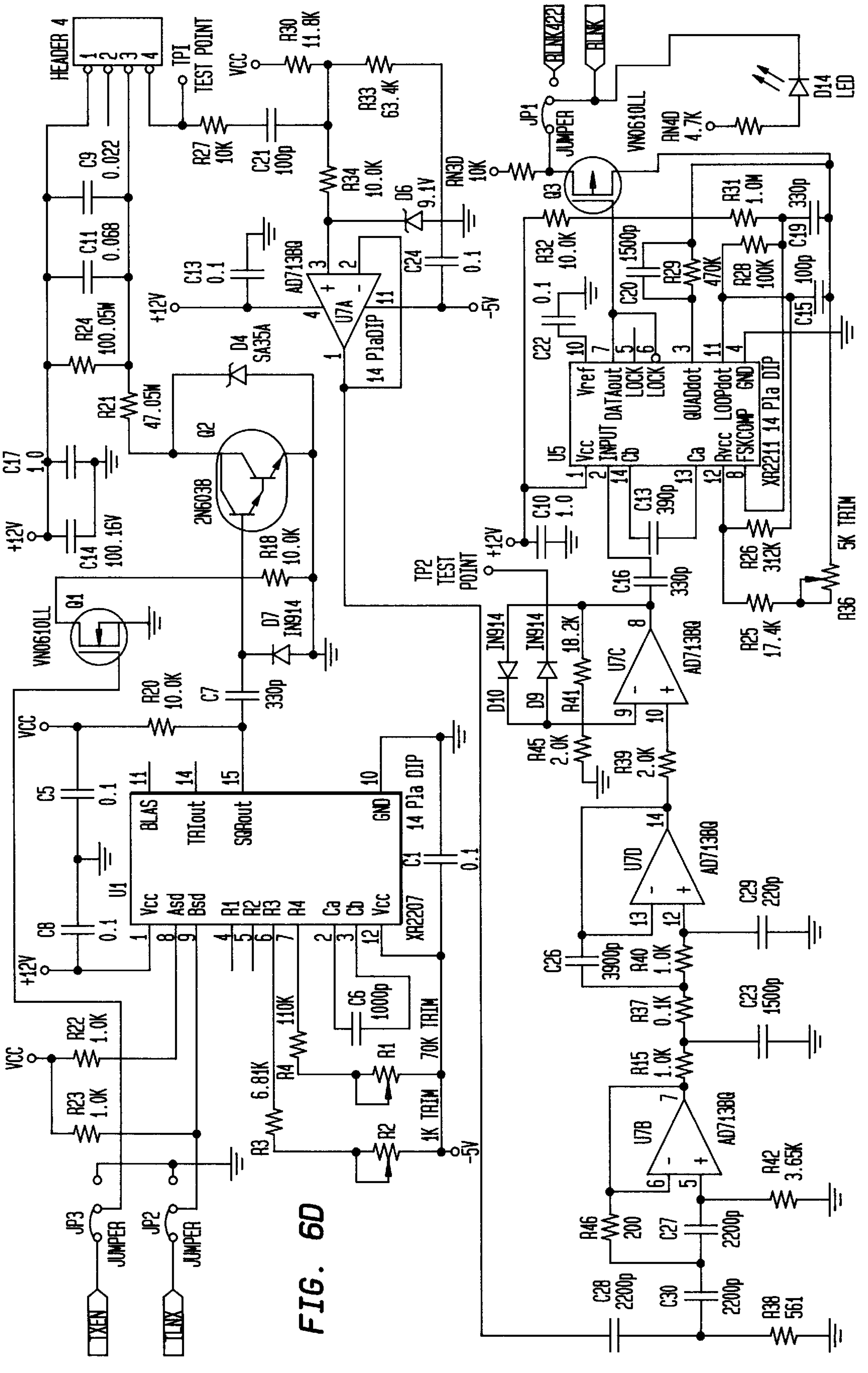
FIG. 6*d* is a schematic diagram which shows the high frequency signal generation and detection circuitry of a master board in accordance with an exemplary embodiment of the present invention.

FIG. 6*d* shows a schematic for the high frequency signal generation and detection circuitry.

This circuitry is similar to that found in the remote circuitry of FIG. 4*c*. The output of FSK generator U1 (with an amplitude that varies between +5 V to −5 V) is provided to the base of a Darlington transistor Q2 for amplification. The resulting signal is input into buffer U7A via capacitor C21. Capacitor C21 is used to limit or at least reduce low frequency noise. The signal is then amplified four times by amplifiers U7A, U7B, U7D and U7C, as follows. The resistor pair R30 and R33 sets the received signal at approximately 2.5 V. The buffered signal goes to high pass filter U7B and then to low pass filter U7D. The resulting signal is sent to limiter U7C to prevent or at least reduce the likelihood of random high amplitude signals passing through to the FSK detector U5. The resistor R36 is tuned to the FSK center frequency (125 KHz). The resulting receive signal is buffered, logic level shifted and inverted by transistor Q3. The transistor Q3 then sends the signal via a jumper JP1 at terminal "RLNK".

While the present inventions have been described in connection with what are the most practical and preferred embodiments, as currently contemplated, it should be understood that the present inventions are not limited to the disclosed embodiments. Accordingly, the present inventions, as claimed, are intended to cover various modifications, arrangements, methods and structures that are within the spirit and scope of the claims.

What is claimed:

1. A control system for a lamp in an airfield lighting system including an electrical circuit comprising a plurality of transformers, each transformer having a primary winding and a secondary winding, wherein the primary windings of the plurality of transformers are connected in series, the circuit being adapted to conduct an electrical current through the series-connected primary windings and at least one transformer of the plurality of transformers being adapted to provide operational power to the lamp, the control system comprising:

- a master controller which applies an electrical control signs to the circuit;
- a remote controller, connected to the secondary winding of the one transformer, said remote controller comprising:
  - means for receiving the electrical control signal from the secondary winding of the transformer as transmitted through the transformer from the primary winding of the transformer,
  - a switch, coupled to the transformer secondary winding and responsive to a switching signal, to selectively energize the lamp,
  - control means, responsive to the received electrical control signal, for generating the switching signal to control the lamp,
  - means responsive to the received electrical signal for generating an acknowledge message, and
  - means for applying the acknowledge message to the secondary winding of the one transformer to convey the acknowledge message to the master controller through the series-connected primary windings.

2. A control system according to claim 1, wherein:

the remote controller means further includes:

- means for sensing operational failure of the lamp;
- means for generating a message indicating the sensed operational failure of the lamp;
- means for applying the message to the secondary winding of the one transformer; and
- the master controller further includes means coupled to the circuit for receiving the message from the series-connected primary windings of the plurality of transformers.

3. A control system according to claim 2, wherein said remote controller includes means for applying a short circuit to the secondary winding of the one transformer when the lamp failure condition is detected.

4. A control system according to claim 1, wherein an other transformer of the plurality of transformers is connected to provide operational power to an aircraft detection means, and the control system further comprises

- a further remote controller means further comprising:
  - means, coupled to the aircraft detection means for generating a message when the aircraft detection means detects an aircraft; and
  - means for applying the message to the secondary winding of the other transformer; and
  - the master controller further comprises means coupled to the circuit for receiving the message from the series-connected primary windings of the plurality of transformers.

5. A control system for a lamp in an airfield lighting system including an electrical circuit comprising a plurality of transformers, each transformer having a primary winding and a secondary winding, wherein the primary windings of the plurality of transformers are connected in series, the circuit being adapted to conduct an electrical current through the series-connected primary windings and at least one transformer of the plurality of transformers being adapted to provide operational power to the lamp, the control system comprising:

a master controller which applies an electrical control signal to the circuit;

a remote controller, connected to the secondary winding of the one transformer, said remote controller means comprising:

means for receiving the electrical control signal from the secondary winding of the transformer, a switch, coupled to the transformer secondary winding and responsive to a switching signal, to selectively energize the lamp, and control means, responsive to the received electrical control signal, for generating the switching signal to control the lamp;

a further remote controller, coupled to an other one of the plurality of transformers, the further remote controller comprising:

means for receiving the electrical control signal for the lamp from the secondary of the other transformer;

means for formatting the electrical control signal into a repeated electrical control signal; and means for applying the repeated electrical control signal to the secondary winding of the other transformer to couple the repeated electrical control signal to control the lamp coupled to the one transformer.

6. A control system according to claim 5, wherein the electrical control signal includes an address value and each of the remote controller and the further remote controller has a respective address value and means for matching the address value in the electrical control signal to the address value in the remote controller before responding to the electrical control signal.

7. A control system according to claim 1, wherein the airfield lighting system includes a tower computer which issues a command to control the lamp, and wherein:

the master controller includes:

a processor coupled to receive the command from the tower computer; and means for modulating a carrier signal with the command to generate the electrical control signal, the carrier signal having a frequency which passes between the primary winding and the secondary winding of the transformer; and the remote controller includes filtering means for separating signals having frequencies approximately equal to the carrier frequency from signals received at the secondary winding of the transformer to receive the electrical control signal.

8. A control system for a lamp in an airfield lighting system including an electrical circuit comprising a plurality of transformers, each transformer having a primary winding and a secondary winding, wherein the primary windings of the plurality of transformers are connected in series, the circuit being adapted to conduct an electrical current through the series-connected primary windings and at least one transformer of the plurality of transformers being adapted to provide operational power to the lamp, the airfield lighting system further including a tower computer which issues a commands to control the lamp, the control system comprising:

a master controller which applies an electrical control signal to the circuit, comprising:

a processor coupled to receive the command from the tower computer;

means for modulating a carrier signal with the command to generate the electrical control signal, the carrier signal having a frequency which passes between the primary winding and the secondary winding of the transformer; and a remote controller, connected to the secondary winding of the one transformer, said remote controller comprising:

means for receiving the electrical control signal from the secondary winding of the transformer;

a switch, coupled to the transformer secondary winding and responsive to a switching signal, to selectively energize the lamp;

control means, responsive to the received electrical control signal, for generating the switching signal to control the lamp;

filtering means for separating signals having frequencies approximately equal to the carrier frequency from signals received at the secondary winding of the transformer to receive the electrical control signal;

means responsive to the received electrical signal for generating an acknowledge message; and means for applying the acknowledge message to the secondary winding of the one transformer;

wherein, the master controller further includes means coupled to the circuit for receiving the acknowledge message from the series-connected primary windings of the plurality of transformers, wherein, if the acknowledge message is not received in a predetermined time interval following the application of the electrical control signal to the circuit, the master controller applies the electrical control signal to the circuit again.

9. A control system according to claim 8, wherein the master controller includes means includes means for sending a message to the tower computer indicating that the lamp cannot be controlled if the acknowledge message is not received by the master controller after the control electrical signal has been applied to the circuit a predetermined number of times.

10. A control system according to claim 9, wherein the signal on the secondary of each of said transformers has a voltage of between approximately 2 volts RMS and approximately 75 volts RMS and the frequency of the carrier signal is approximately 125 KHz.

11. A control system according to claim 1, wherein the switch comprises a relay having switch contacts coupled in parallel with the lamp, the relay being responsive to the control signal to selectively open the switch contacts to provide operational power to the lamp.

12. A control system according to claim 11, wherein the switch further comprises electronic switching means, coupled in parallel with the relay for providing a short circuit across the switch contacts of the relay while the relay is controlled to open or close the switch contacts.

13. A method for controlling a lamp in an airfield lighting system which includes an electrical circuit comprising a plurality of transformers, each transformer having a primary winding and a secondary winding, wherein the primary windings of the plurality of transformers are connected in series, the circuit being adapted to conduct an electrical current through the series-connected primary windings and at least one transformer of the plurality of transformers being adapted to provide operational power to the lamp via a remote controller coupled to its secondary winding, the control method comprising the steps of:

applying an electrical control signal to the circuit;

receiving, at the remote controller, the electrical control signal from the operational power signal provided at the secondary winding of the one transformer as transmitted through the transformer from the primary winding of the one transformer;

generating a lamp control signal from the received electrical control signal to control the lamp;

switching, at the remote controller and responsive to the lamp control signal, the operational power signal provided by the secondary winding of the one transformer, to selectively energize the lamp;

generating, in the remote controller, an acknowledge message, and applying the acknowledge message to the secondary winding of the one transformer to convey the acknowledge message to the series-connected primary windings.

14. A method for controlling first and second lamps in an airfield lighting system which includes an electrical circuit comprising a plurality of transformers, each transformer having a primary winding and a secondary winding, wherein the primary windings of the plurality of transformers are connected in series, the circuit being adapted to conduct an electrical current through the series-connected primary windings and a first transformer of the plurality of transformers being adapted to provide operational power to the first lamp via a first remote controller coupled to the secondary winding of the first transformer, and a second transformer of the plurality of transformers being adapted to provide operational power to the second lamp via a second remote controller coupled to the secondary winding of the second transformer, the control method comprising the steps of:

applying an electrical control signal including an address value and a lamp control value to the circuit;

receiving the electrical control signal, at the first remote controller, from the operational power signal provided at the secondary winding of the first transformer as transmitted through the first transformer from the primary winding of the first transformer;

comparing the address value in the received electrical control signal to an address value for the first remote controller;

generating a lamp control signal from the lamp control value of received electrical control signal if the address value of the received electrical control signal matches the address value of the first remote controller;

switching, at the first remote controller and responsive to the lamp control signal, the operational power signal provided by the secondary winding of the first transformer, to selectively energize the first lamp;

generating, in the remote controller, an acknowledge message including the address value of the first remote controller, and applying the acknowledge message to the secondary winding of the one transformer to convey the acknowledge message through the circuit.

15. A method for controlling first and second lamps in an airfield lighting system which includes an electrical circuit comprising a plurality of transformers, each transformer having a primary winding and a secondary winding, wherein the primary windings of the plurality of transformers are connected in series, the circuit being adapted to conduct an electrical current through the series-connected primary windings and a first transformer of the plurality of transformers being adapted to provide operational power to the first lamp via a first remote controller coupled to the secondary winding of the first transformer, and a second transformer of the plurality of transformers being adapted to provide operational power to the second lamp via a second remote controller coupled to the secondary winding of the second transformer, the control method comprising the steps of:

applying an electrical control signal including an address value and a lamp control value to the circuit including the steps of;

applying a first message signal to the circuit to configure the second remote controller as a repeater for the first remote controller;

generating a second message signal, the second message signal being addressed to the second remote controller as a repeater for the first remote controller and including a message for the first remote controller to control the first lamp;

applying the second message signal to the circuit;

receiving the second message signal from the operational power signal provided by the secondary winding of the second transformer to the second remote controller;

processing the received second message signal, at the second remote controller, to generate a third message signal corresponding to the electrical control signal; and applying the third message signal to the circuit via the secondary winding of the second transformer to control the first lamp;

receiving the electrical control signal, at the first remote controller, from the operational power signal provided at the secondary winding of the first transformer;

comparing the address value in the received electrical control signal to an address value for the first remote controller;

generating a lamp control signal from the lamp control value of received electrical control signal if the address value of the received electrical control signal matches the address value of the first remote controller; and switching, at the remote controller and responsive to the lamp control signal, the operational power signal provided by the secondary of the first transformer, to selectively energize the first lamp.

16. Apparatus for lighting an airfield comprising:

a constant current regulator having an output terminal and a return terminal;

a plurality of transformers each having a primary winding and a secondary winding, the primary windings being connected as a series circuit such that the first primary winding in the series is coupled to the output terminal of the constant current regulator and the last primary winding in the series is connected to the return terminal of the constant current regulator;

a master controller coupled to the output terminal of the constant current regulator, the master controller including a first modem which couples a lamp control signal to the series connected transformer primary windings;

a remote controller coupled to the secondary of one transformer of the plurality of transformers including a second modem which receives the lamp control signal from the secondary winding of the one transformer as transmitted through the transformer from the primary winding of the one transformer and which provides an acknowledge message to the secondary winding of the one transformer to convey the acknowledge message through the transformer to the master controller;

a switch coupled to receive operational power from the secondary winding of the one transformer and responsive to the received control signal to apply the operational power to the lamp.

17. Apparatus for lighting an airfield according to claim 16, wherein the secondary winding of each transformer of the plurality of transformers is coupled to a respectively different one of a plurality of remote controllers, each remote controller in the plurality of remote controllers has a different address value, and each remote controller includes its address value in the acknowledge message.

* * * * *